US012664771B2

(12) United States Patent
Munir et al.

(10) Patent No.: US 12,664,771 B2
(45) Date of Patent: Jun. 23, 2026

(54) TRAIN-TIME LOSS IN A SYSTEM AND METHOD FOR CALIBRATING OBJECT DETECTION

(71) Applicant: Mohamed bin Zayed University of Artificial Intelligence, Abu Dhabi (AE)

(72) Inventors: Muhammad Akhtar Munir, Abu Dhabi (AE); Muhammad Haris Khan, Abu Dhabi (AE); Salman Khan, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 277 days.

(21) Appl. No.: 18/526,254

(22) Filed: Dec. 1, 2023

(65) Prior Publication Data

US 2025/0061697 A1 Feb. 20, 2025

Related U.S. Application Data

(60) Provisional application No. 63/520,454, filed on Aug. 18, 2023.

(51) Int. Cl.
G06V 10/82 (2022.01)
G06V 10/776 (2022.01)

(52) U.S. Cl.
CPC ............ G06V 10/82 (2022.01); G06V 10/776 (2022.01)

(58) Field of Classification Search
CPC ...... G06V 10/82; G06V 10/776; G06V 20/58; G06V 10/764
See application file for complete search history.

(56) References Cited

U.S. PATENT DOCUMENTS

| | | | | |
|---|---|---|---|---|
| 2020/0356812 A1* | 11/2020 | Oleynik | .............. | G06N 3/0895 |
| 2021/0117760 A1* | 4/2021 | Krishnan | ............. | G06N 3/0464 |
| 2021/0365744 A1* | 11/2021 | Navarrete Michelini | ................... | |
| | | | | G06N 3/08 |
| 2021/0383139 A1* | 12/2021 | Jia | .......................... | G06N 3/084 |

(Continued)

FOREIGN PATENT DOCUMENTS

| | | |
|---|---|---|
| CN | 109345547 B | 8/2021 |
| KR | 10-2023-0075125 | 5/2023 |

OTHER PUBLICATIONS

Munir et al. ; Towards Improving Calibration in Object Detection Under Domain Shift ; NeurIPS 2022 ; Sep. 15, 2022 ; 17 Pages.

*Primary Examiner* — Syed Haider
(74) *Attorney, Agent, or Firm* — Oblon, McClelland, Maier & Neustadt, L.L.P.

(57) ABSTRACT

A system and method of training a deep neural network for object detection in an object detection system. The object detection system including a camera and a controller including the DNN. The method including capturing an image by the camera, receiving the image, predicting, using the DNN, a bounding box and corresponding class label, evaluating the prediction with a total loss function including an object detection loss function, a box regression loss function, and a calibration loss function that takes into account precision and confidence. The method outputs a calibrated image with the object bounding box, the corresponding label, and a respective confidence score, in which the confidence score is a probability associated with the predicted class label.

17 Claims, 27 Drawing Sheets

(56)     References Cited

U.S. PATENT DOCUMENTS

2023/0267719  A1*    8/2023   Parchami  ............. G06V 10/765
                                                 382/156
2023/0360246  A1*   11/2023   Hakami  ................. G06V 10/82

* cited by examiner

AC: Accurate Confident
AN: Accurate Not Confident
IC: Inaccurate Confident
IN: Inaccurate Not Confident Baseline
Uncalibrated BPC
Calibrated Baseline
Uncalibrated BPC
Calibrated Baseline Uncalibrated BPC Calibrated Baseline
Uncalibrated BPC
Calibrated Baseline
Uncalibrated BPC
Calibrated

TRAIN-TIME LOSS IN A SYSTEM AND METHOD FOR CALIBRATING OBJECT DETECTION

CROSS-REFERENCE TO RELATED APPLICATIONS

This application claims the benefit of priority to provisional application No. 63/520,454 filed Aug. 18, 2023, the entire contents of which are incorporated herein by reference.

STATEMENT REGARDING PRIOR DISCLOSURE BY THE INVENTORS

Aspects of this technology are described in an article Munir, Muhammad Akhtar, Muhammad Haris Khan, Salman Khan, and Fahad Shahbaz Khan. "Bridging Precision and Confidence: A Train-Time Loss for Calibrating Object Detection." In *Proceedings of the IEEE/CVF Conference on Computer Vision and Pattern Recognition*, pp. 11474-11483, 2023 which is incorporated by reference in its entirety.

BACKGROUND

Technical Field

The present disclosure relates to a method and system for object detection. The method and system are particularly suited for safety critical features in vehicles and medical detection systems.

Description of the Related Art

Computer vision systems made up of cameras and the accompanying vision algorithms are being used for applications such as surveillance, remote sensing, and automated cars. Semantic understanding of outdoor scenes is a crucial enabler for applications such as assisted or autonomous driving. Typical examples include road and lane detection, traffic light detection, car and pedestrian detection, and a dense, pixel-level segmentation of road scenes into most of the relevant semantic classes.

Safety-critical applications such as car and pedestrian detection, road and lane detection, traffic light detection, and road scenes require precise detection. These safety-critical applications must function under suboptimal vision conditions such as adverse weather conditions. For example, an automated car requires a robust detection of road lanes, traffic lights, and other traffic indicators in the presence of various weather conditions in addition to photo quality lighting conditions.

Deep neural networks (DNNs) have shown remarkable results in various mainstream computer vision tasks, including image classification, object detection, and semantic segmentation. See Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An image is worth 16×16 words: Transformers for image recognition at scale. In *International Conference on Learning Representations,* 2021: Kaiming He, Xiangyu Zhang, Shaoqing Ren, and Jian Sun. Deep residual learning for image recognition. In *Proceedings of the IEEE conference on computer vision and pattern recognition*, pages 770-778, 2016; Karen Simonyan and Andrew Zisserman.

Very deep convolutional networks for large-scale image recognition. *arXiv preprint arXiv:* 1409.1556, 2014; Shaoqing Ren, Kaiming He, Ross Girshick, and Jian Sun. Faster r-cnn: Towards real-time object detection with region proposal networks. In Advances in neural information processing systems, pages 91-99, 2015: Zhi Tian, Chunhua Shen, Hao Chen, and Tong He. Fcos: Fully convolutional one-stage object detection. In *Proceedings of the IEEE international conference on computer vision*, pages 9627-9636, 2019; Xizhou Zhu, Weijie Su, Lewei Lu, Bin Li, Xiaogang Wang, and Jifeng Dai. Deformable {detr}: Deformable transformers for end-to-end object detection. In *International Conference on Learning Representations,* 2021: Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. *IEEE transactions on pattern analysis and machine intelligence,* 40(4): 834-848, 2018; and Robin Strudel, Ricardo Garcia, Ivan Laptev, and Cordelia Schmid. Segmenter: Transformer for semantic segmentation. In 2021 *IEEE/CVF International Conference on Computer Vision (ICCV)*, pages 7242-7252, 2021.

However, deep learning models have shown a tendency to provide overconfident predictions. See Chuan Guo, Geoff Pleiss, Yu Sun, and Kilian Q Weinberger. On calibration of modern neural networks. In *International Conference on Machine Learning*, pages 1321-1330. PMLR, 2017; and Jishnu Mukhoti, Viveka Kulharia, Amartya Sanyal, Stuart Golodetz, Philip Torr, and Puneet Dokania. Calibrating deep neural networks using focal loss. *Advances in Neural Information Processing Systems,* 33:15288-15299, 2020.

By definition, a prediction by a calibrated model with confidence s aligns with the occurrence of a sample with the same s. A prediction model is overconfident when it satisfies the condition of correctness with <5%, and underconfident when>s %.

Overconfident predictions greatly limit the overall trust in their predictions, especially when they are part of the decision-making system in safety-critical applications. See Michael W Dusenberry, Dustin Tran, Edward Choi, Jonas Kemp, Jeremy Nixon, Ghassen Jerfel, Katherine Heller, and Andrew M Dai. Analyzing the role of model uncertainty for electronic health records. In *Proceedings of the ACM Conference on Health. Inference, and Learning*, pages 204-213, 2020; Sorin Grigorescu, Bogdan Trasnea, Tiberiu Cocias, and Gigel Macesanu. A survey of deep learning techniques for autonomous driving. *Journal of Field Robotics,* 37(3): 362-386, 2020; and Monika Sharma, Oindrila Saha, Anand Sriraman, Ramya Hebbalaguppe, Lovekesh Vig, and Shirish Karande. Crowdsourcing for chromosome segmentation and deep classification. In *Proceedings of the IEEE conference on computer vision and pattern recognition workshops*, pages 34-41, 2017.

As one example of the effect of reduced trust, a decision system in an AI-powered healthcare diagnostic application can safely reject predictions with low confidence. However, if it mistakenly skips reviewing an incorrect prediction with high confidence, it can lead to serious consequences.

As another example of the effect of reduced trust, an automated car may safely reject detection of road lanes, traffic lights, and other traffic indicators with low confidence. However, the automated car may mistakenly skip reviewing an incorrect detection of cars or pedestrians in the presence of fog with high confidence.

An important underlying reason behind the miscalibration of DNNs is training with zero-entropy supervision signal which makes them overconfident, and thus inadvertently miscalibrated. There have been few attempts towards improving the model calibration. A prominent technique is based on a post-processing step that transforms the outputs of a trained model with parameter(s) learned on a held-out validation set. See Guo et al.; Mobarakol Islam, Lalithkumar Seenivasan, Hongliang Ren, and Ben Glocker. Class-distribution-aware calibration for long-tailed visual recognition. *arXiv preprint arXiv:* 2109.05263, 2021: Byeongmoon Ji, Hyemin Jung, Jihyeun Yoon, Kyungyul Kim, and Younghak Shin. Bin-wise temperature scaling (bts): Improvement in confidence calibration performance through simple scaling techniques. 2019 *IEEE/CVF International Conference on Computer Vision Workshop (ICCVW)*, pages 4190-4196, 2019; Meelis Kull, Telmo Silva Filho, and Peter Flach. Beta calibration: a well-founded and easily implemented improvement on logistic calibration for binary classifiers. In *Artificial Intelligence and Statistics*, pages 623-631. PMLR, 2017; and John Platt et al. Probabilistic outputs for support vector machines and comparisons to regularized likelihood methods. *Advances in large margin classifiers,* 10(3):61-74, 1999, each incorporated herein by reference in their entirety. Although simple to implement, these methods are architecture and data-dependent, and further requires a separate held-out validation set which is not readily available in many real-world applications. See Bingyuan Liu, Ismail Ben Ayed, Adrian Galdran, and Jose Dolz. The devil is in the margin: Margin-based label smoothing for network calibration. In *Proceedings of the IEEE/CVF Conference on Computer Vision and Pattern Recognition (CVPR)*, pages 80-88, June 2022. An alternative approach is a train-time calibration method which tends to involve all model parameters during training. Existing train-time calibration methods propose an auxiliary loss term that can be used in conjunction with an application-specific loss function (e.g., Cross Entropy or Focal loss). See Ramya Hebbalaguppe, Jatin Prakash, Neelabh Madan, and Chetan Arora. A stitch in time saves nine: A train-time regularizing loss for improved neural network calibration. In *Proceedings of the IEEE/CVF Conference on Computer Vision and Pattern Recognition (CVPR)*, pages 16081-16090, June 2022; Ranganath Krishnan and Omesh Tickoo. Improving model calibration with accuracy versus uncertainty optimization. Advances in Neural Information Processing Systems, 2020; Gongbo Liang, Yu Zhang, Xiaoqin Wang, and Nathan Jacobs. Improved trainable calibration method for neural networks on medical imaging classification. In *British Machine Vision Conference (BMVC)*, 2020; Liu et al.; and Mukhoti et al. Recently, a differentiable auxiliary loss formulation to calibrate the class confidence of both the predicted label along with non-predicted labels has been proposed.

Almost all work towards improving model calibration targets the task of classification. See Guo et al.; Hebbalaguppe et al.: Aviral Kumar, Sunita Sarawagi, and Ujjwal Jain. Trainable calibration measures for neural networks from kernel mean embeddings. In *International Conference on Machine Learning*, pages 2805-2814. PMLR, 2018: Liang et al.; and Liu et al Most of the work for calibrating DNNs can be categorized as: post-hoc and train-time methods. Post-hoc methods require hold-out validation set and involve a few parameters, whereas train-time methods do not require validation data and involve all model parameters.

Post-hoc methods: A simple and classic approach to improving model calibration is temperature scaling (TS), which is an extension of Platt scaling from binary to multi-class settings. See Guo et al.; and Platt et al., both incorporated herein by reference. TS uses a parameter to modulate the logits of a trained model, whereby this parameter is estimated using hold-out data. This lowers the predicted confidence to achieve calibration. A more general form of TS is matrix scaling for the transformation of logits. This matrix is learned in a similar way using hold-out validation set. Besides involving limited parameters, the majority of post-hoc methods are limited to calibrating in-domain predictions. See Yaniv Ovadia, Emily Fertig, Jie Ren, Zachary Nado, David Sculley, Sebastian Nowozin, Joshua Dillon, Balaji Lakshminarayanan, and Jasper Snoek. Can you trust your model's uncertainty? evaluating predictive uncertainty under dataset shift. *Advances in neural information processing systems,* 32, 2019, incorporated herein by reference in its entirety. Further, these post-hoc calibration methods are prone to performing poorly for dense prediction tasks. See Hebbalaguppe et al. To improve post-hoc calibration under out-domain scenarios, Tomani et al. transforms the validation set prior to performing the post-hoc approach. See Christian Tomani, Sebastian Gruber, Muhammed Ebrar Erdem, Daniel Cremers, and Florian Buettner. Post-hoc uncertainty calibration for domain drift scenarios. In *Proceedings of the IEEE/CVF Conference on Computer Vision and Pattern Recognition*, pages 10124-10132, 2021, incorporated herein by reference in its entirety. In Ding et al., a regression model is used to predict temperature parameter. See Zhipeng Ding, Xu Han, Peirong Liu, and Marc Niethammer. Local temperature scaling for probability calibration. In *Proceedings of the IEEE/CVF International Conference on Computer Vision*, pages 6889-6899, 2021, incorporated herein by reference in its entirety. Post-hoc calibration methods are simple and effective, however, they require hold-out validation data, and are dependent on architecture. See Liu et al.

Train-time calibration methods: Models trained with zero-entropy supervision tend to give over-confident predictions. An example is negative log-likelihood (NLL), which is a widely-used task-specific loss. A model trained with NLL provides predictions that deviate from the accuracy, leaving the model poorly calibrated. See Guo et al. Train-time calibration methods are typically based on auxiliary loss functions, which are used in-tandem with task-specific losses. In Liang et al., an auxiliary loss term DCA is proposed to calibrate the model. It is combined with a task-specific loss to penalize when it reduces but the accuracy remains unchanged. Likewise, Kumar et al. proposed an auxiliary loss function that is based on a reproducing kernel in a Hilbert space. See Arthur Gretton. Introduction to rkhs, and some simple kernel algorithms. *Adv. Top. Mach. Learn. Lecture Conducted from University College London,* 16:5-3, 2013. Uncertainty can be calibrated based on the relationship between accuracy and uncertainty. A loss known as the multi-class difference of confidence and accuracy which aims to calibrate the predicted confidence of all classes was proposed. Building on the label smoothing (LS) work a margin constraint logit distances to achieve implicit model calibration has been introduced. See Christian Szegedy, Vincent Vanhoucke, Sergey Ioffe, Jon Shlens, and Zbigniew Wojna. Rethinking the inception architecture for computer vision. In Proceedings of the IEEE conference on computer vision and pattern recognition, pages 2818-2826, 2016; and Liu et al., incorporated herein by reference in its entirety.

Model calibration with OOD detection indicates that the ReLU activation function may cause the model to provide overconfident predictions for input samples that lie away from the training samples. See Matthias Hein, Maksym Andriushchenko, and Julian Bitterwolf. Why relu networks yield high-confidence predictions far away from the training data and how to mitigate the problem. In *Proceedings of the IEEE/CVF Conference on Computer Vision and Pattern Recognition*, pages 41-50, 2019, incorporated by reference in its entirety. To circumvent this, a model is forced to output low scores for samples distant from training data by leveraging data augmentation using adversarial training. OOD inputs can be detected with spectral analysis over early layers in convolutional neural networks (CNNs), thereby achieving model calibration. See Davood Karimi and Ali Gholipour. Improving calibration and out-of-distribution detection in deep models for medical image segmentation. *IEEE Transactions on Artificial Intelligence*, 2022, incorporated herein by reference in its entirety.

All post-hoc and train-time losses target the calibration of classification models, and there is almost no attention given to the calibration of object detection models. An object of the present disclosure is therefore to provide a method and system for calibration of DNN-based object detectors. A further object is a training-time calibration method and system based on a new auxiliary loss function (Bridging Precision and Confidence, BPC). An object is an auxiliary loss function that is differentiable, operates over mini-batches, and effectively calibrates object detectors for in-domain and out-domain detections.

SUMMARY

An aspect is a method of training a deep neural network (DNN) for object detection in an object detection system, the object detection system including a camera and a controller including the DNN, the method can include capturing an image by the camera; receiving, by the controller, the image: predicting, using the DNN, a bounding box and corresponding class label: evaluating, by the controller, the prediction with a total loss function including an object detection loss function, a box regression loss function, and a calibration loss function that takes into account precision and confidence; and outputting, by the controller, a calibrated image with the object bounding box, the corresponding label, and a respective confidence score, wherein the confidence score is a probability associated with the predicted class label.

A further aspect is an autonomous vehicle control system, that can include at least one camera mounted on the autonomous vehicle for capturing an image of an environment outside of the autonomous vehicle: a controller connected to the at least one camera, the controller configured to receive an image captured by the at least one camera, predict, using a deep learning network (DNN), a bounding box and corresponding class label, evaluate the prediction with a total loss function including an object detection loss function, a box regression loss function, and a calibration loss function that takes into account precision and confidence; and output a calibrated image with the object bounding box, the corresponding label, and a respective confidence score, wherein the confidence score is a probability associated with the predicted class label.

A further aspect is a non-transitory computer-readable storage medium including computer executable instructions, wherein the instructions, when executed by a computer, cause the computer to perform a method can include capturing an image by a camera; receiving, by the computer, the image: predicting, using a deep learning neural network DNN, a bounding box and corresponding class label: evaluating, by the computer, the prediction with a total loss function including an object detection loss function, a box regression loss function, and a calibration loss function that takes into account precision and confidence; and outputting, by the computer, a calibrated image with the object bounding box, the corresponding label, and a respective confidence score, wherein the confidence score is a probability associated with the predicted class label.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

There is a need for calibration of object detection models. Object detectors are of great importance to many vision-based safety-critical applications. Similar to classification models, object detection models also occupy an important position in many safety-critical applications. For instance, they form an integral part of the perception component of self-driving vehicles. Furthermore, a majority of efforts tackling model calibration focus on calibrating in-domain predictions. A deployed deep learning-based model can encounter samples from a distribution that is radically different from the training distribution. Therefore, a real-world model should be well-calibrated for both in-domain and out-domain predictions. Consequently, there is a need for well-calibrated object detectors, particularly under distribution shifts.

Aspects of the present disclosure include a method of training a deep neural network (DNN) for object detection including receiving an input image using the DNN to predict a bounding box and label for the input image: wherein a calibration loss function takes into account precision and confidence.

In an embodiment the calibration loss is a function of the number of detections that are categorized as accurate and/or confident.

In an embodiment the function of the number of detections includes a confidence score that is modulated by a hyperbolic tangent function.

In an embodiment the calibration loss function aligns higher accuracy with higher confidence.

In an embodiment the method includes perceiving objects, by the DNN, with a camera in a self-driving car.

Figure 1A:
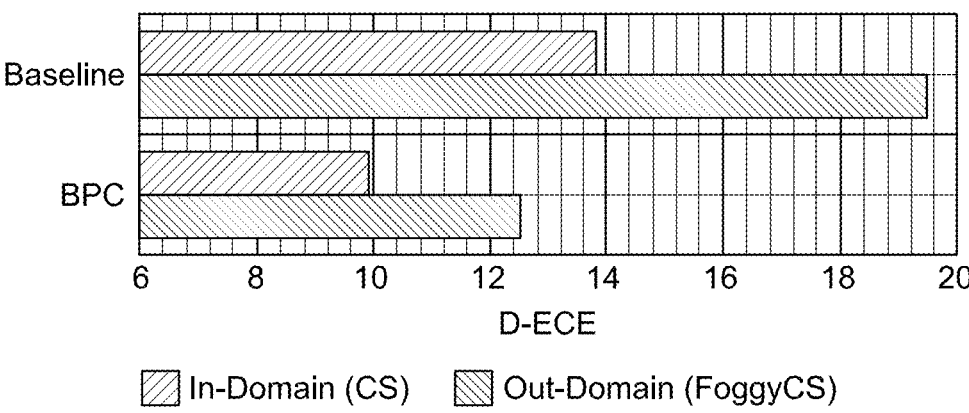
FIGS. 1A and 1B illustrates a comparison in terms of Detection Expected Calibration Error (D-ECE) on in-domain Cityscapes (CS) and out-domain FoggyCS datasets.
Figure 1B:
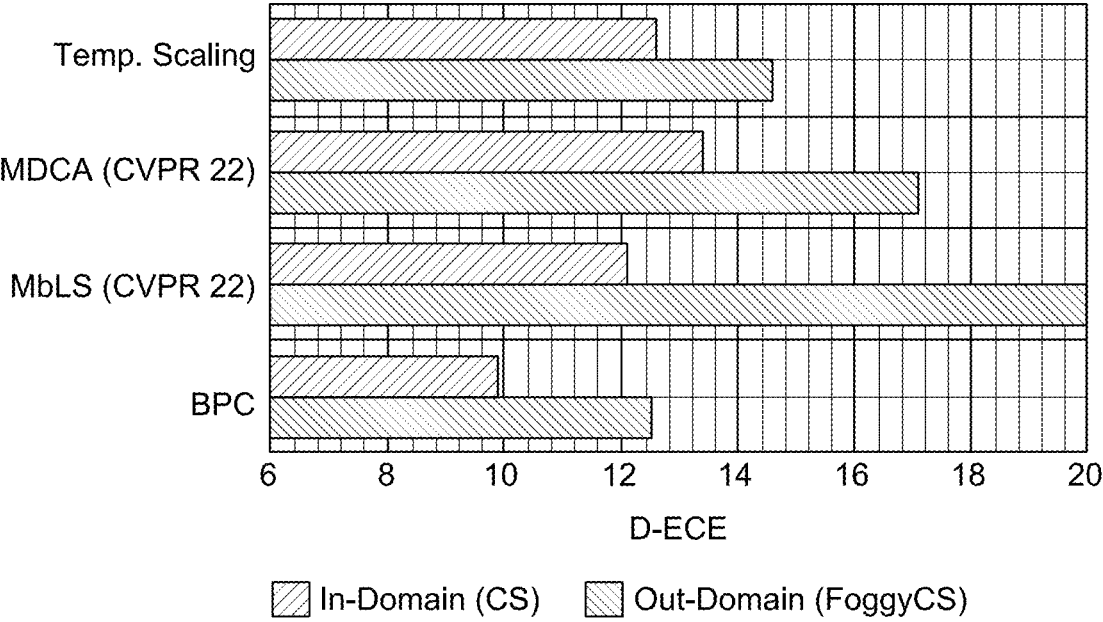

FIGS. 1A-1B are graphs comparing Detection Expected Calibration Error (D-ECE) on in-domain Cityscapes (CS) and out-domain FoggyCS datasets. The present disclosure addresses the calibration of object detection models for both in-domain and out-domain predictions. It has been determined that the conventional state-of-the-art object detectors are rather miscalibrated when compared to their predictive accuracy.

FIG. 1A is a graph of detection model trained with a BPC loss indicating that the model provides the lowest D-ECE (lower is better). FIG. 1B is a graph of post hoc and train-time calibration methods for classification, indicating that MDCA and MbLS are sub-optimal for object detection. In contrast, the BPC loss better calibrates in-domain and out-domain detections.

Figure 2:
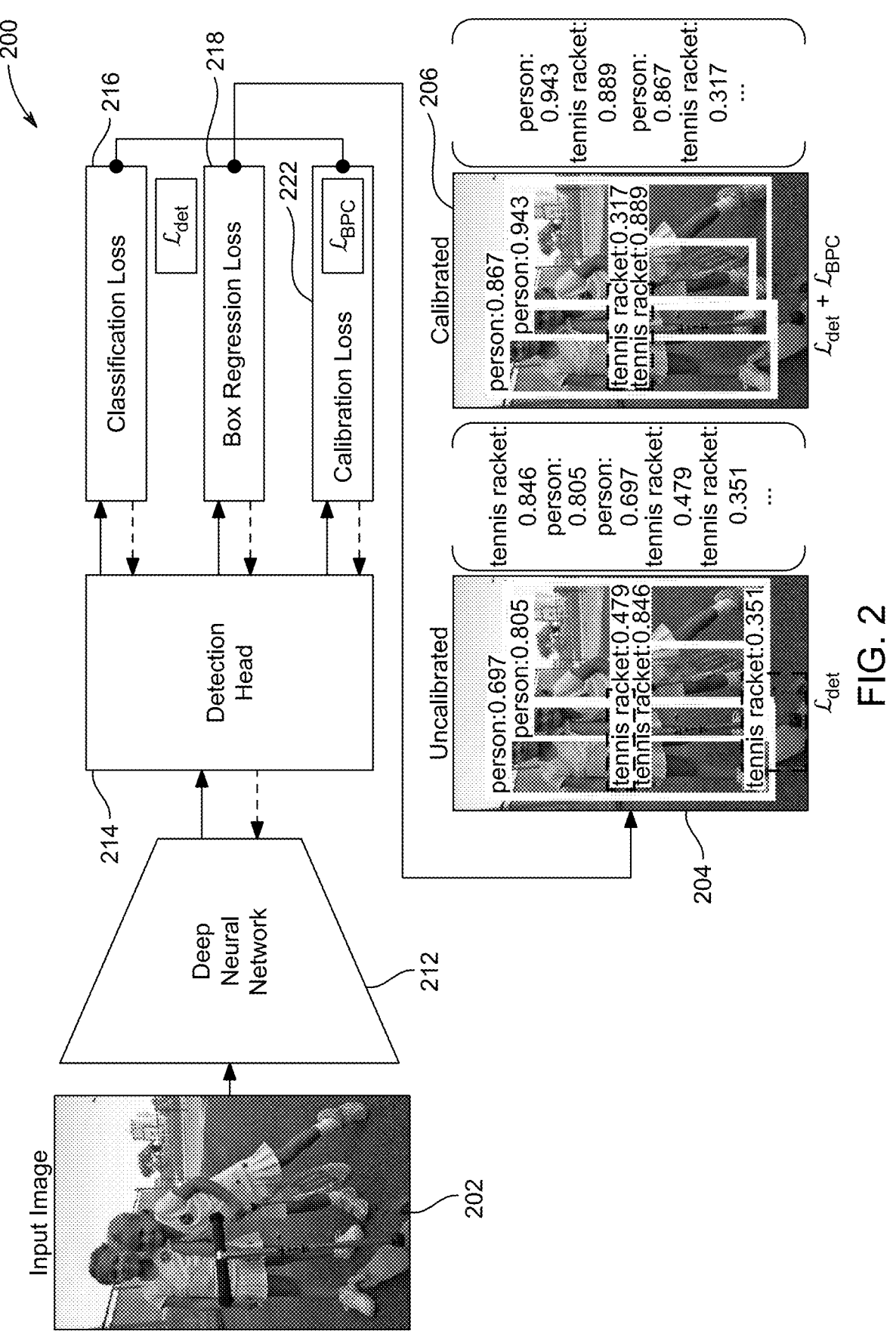
FIG. 2 is a block diagram of a network architecture including a BPC loss function, in accordance with an exemplary aspect of the disclosure.
Figures 3A, 3B:
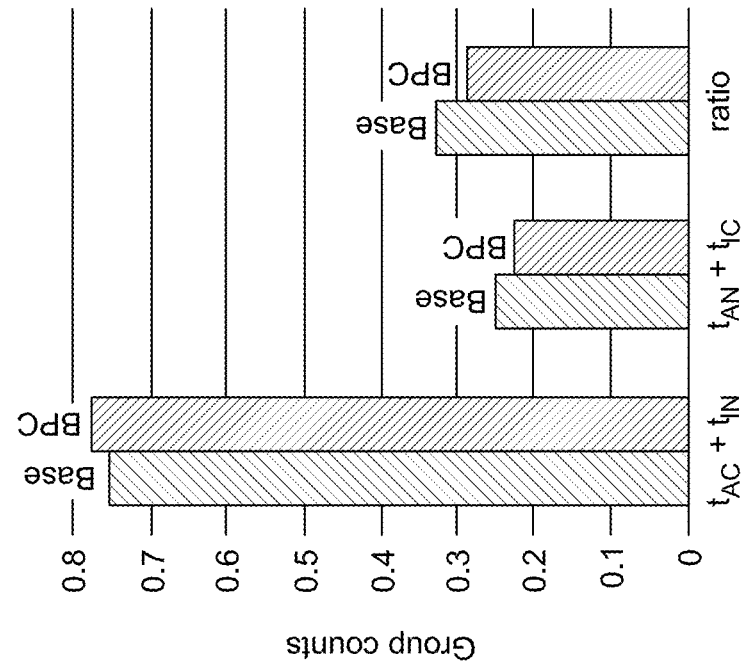
FIG. 3A illustrates the confidence and precision space divided into four groups for categorizing accurate and inaccurate predictions.
FIG. 3B illustrates the results from the BPC loss function compared to baseline.

To this end, the present disclosure provides a solution that includes a train-time auxiliary loss formulation, which explicitly attempts to bridge the model's precision with the predicted class confidence (BPC). FIG. 2 is a block diagram of a network architecture with BPC loss function 222 that is integrated with an object detection architecture 212, 214. The detector 200 predicts well-calibrated probabilities for accurate predictions 206 for an input image 202, while lowering the probabilities of inaccurate prediction (shown in a dashed line). On the other hand, an uncalibrated model 204 predicts scores, lower for accurate predictions and higher for inaccurate predictions. Other boxes show the ground truth boxes present for corresponding detections.

The network architecture leverages the count of true positives and false positives in a minibatch, which are then employed to construct a penalty for miscalibrated predictions. A differentiable proxy is applied to the actual loss formulation that is based on counts. The loss function 222 is designed to be used with other application-specific loss functions. Extensive experiments are performed on both in-domain and out-domain scenarios, including the large-scale MS-COCO benchmark. Results reveal that the train-time auxiliary loss is capable of significantly improving the calibration of a state-of-the-art vision-transformer based object detector under both in-domain and out-domain scenarios.

The term calibration as used in the present disclosure is such that a model is well-calibrated when the predicted confidence is aligned with the likelihood of the sample being correct. For example, a prediction of a calibrated model with confidence s aligns with the occurrence of a sample with the same s. A model is overconfident when it satisfies the condition of correctness with <5%, and underconfident when >s %. Conventional works addressing model calibration typically target the task of classification. In the following, calibration is defined for classification and object detection.

Classification: Given a dataset defined with the joint distribution $\mathcal{D}(\mathcal{X}, \mathcal{Y})$ such that N number of images belonging to C ground truth classes are available. Let $$\mathcal{D} = \left\{ (x_n, y_n)_{n=1}^N \right\},$$

where $x_n = \in \mathcal{X} \in \mathbb{R}^{H \times W \times d}$ (an input image with height H, width W, and number of channels d). For each image, there is a corresponding ground truth class label $y_n \in \mathcal{Y} = \{1, 2, \ldots C\}$. Let $\mathcal{G}_{cls}$ be a classification model that predicts a label $\bar{y}$ with confidence score $\bar{s}$. A perfect classification calibration is defined as: $\mathbb{P}(\bar{y} = y | \bar{s} = s) = s$, s.t., $s \in [0,1]$. According to this expression, accuracy and confidence must align for all confidence levels.

Object Detection: For object detection, the localization of an object is an integral component along with the class label. Therefore, bounding box (b) annotations are also available with corresponding class labels. Specifically, for each object, let $b \in \mathbb{R}^4$ and y correspond to its class label. Given the object detector $\mathcal{G}_{det}$, model predicts a bounding box $\bar{b}$ and label $\bar{y}$ with confidence score $\bar{s}$. The perfect calibration in object detection is defined as: $\mathbb{P}(\bar{K} = 1 | \bar{s} = s) = s$, $\forall s \in [0,1]$. See Fabian Kuppers, Jan Kronenberger, Amirhossein Shantia, and Anselm Haselhoff. Multivariate confidence calibration for object detection. In *Proceedings of the IEEE/CVF Conference on Computer Vision and Pattern Recognition Workshops*, pages 326-327, 2020, incorporated herein by reference in its entirety. Where K=1 denotes an accurate detection in which both the class prediction matches with the ground truth class and the IoU (between the predicted and the ground truth box) is greater than a certain threshold, i.e., $\|[IoU(\bar{b},b) \geq \rho]\| \|[\bar{y}=y]$.

Classification Measurement: Expected calibration error (ECE) is a metric used to quantify the miscalibration of a classification model. It measures the expected deviation of accuracy from the confidence for all confidence levels.

$$\mathbb{E}_{\bar{s}}[\|\mathbb{P}(\bar{y} = y \mid \bar{s} = s) - s\|] \tag{1}$$

As the confidence score is a continuous random variable, the confidence levels are divided into L equally-spaced bins. The approximation of ECE is computed as:

$$ECE = \sum_{l=1}^{L} \frac{|B(l)|}{|\mathcal{D}|} |acc\,(l) - conf\,(l)| \tag{2}$$

where $|\mathcal{D}|$ is the total number of samples, B(l) is the set of samples in the $l^{th}$ bin. Further, acc(l) and conf(l) denote the average accuracy and average confidence over samples in the $l^{th}$ bin, respectively.

Object detection: Similar to ECE for classification, the detection expected calibration error (D-ECE) is defined as the expected deviation of precision from the confidence for all confidence levels:

$$\mathbb{E}_{\bar{s}}[|\mathbb{P}(K=1 \mid \bar{s}=s)-s|] \tag{3}$$

See Kuppers et al.

As confidence is a continuous variable, similar to eq. (2), it can approximate D-ECE:

$$D\text{-}ECE = \sum_{l=1}^{L} \frac{|B(l)|}{|\mathcal{D}|}|prec\,(l)-conf\,(l)| \tag{4}$$

where prec(l) denotes the precision in $l^{th}$ bin. Different from Eq. (2), here, B(l) is the set of object instances in $l^{th}$ bin and $|\mathcal{D}|$ is the total number of object instances.

BPC: Train-time Calibration Loss for Detection

Motivation: DNNs-based object detectors are trained with the objective to predict with high confidence, leaving them miscalibrated for both in-domain and out-of-domain detections. The rationale behind this behavior is the lack of direct supervision for the model to promote higher confidence for accurate predictions and lower confidence for inaccurate predictions. Motivated by this observation, the statistics associated with high-scoring and low-scoring box predictions are leveraged to calibrate the detection model. The true positives and false positives are used to span the precision and confidence space in order to maximize the probability scores for accurate predictions and minimize the same for inaccurate predictions. Specifically, the confidence and precision space are discretized into four partitions for categorizing the accurate and inaccurate detections (see FIG. 4). This lets one develop a simple auxiliary objective, which attempts to distribute the detections according to their respective confidences.

Formulation: An embodiment is a training-time method for calibrating object detectors, at the core of which is an auxiliary loss function 222. The loss function 222 is differentiable, operates on minibatches, and is formulated to be used with other task specific detection losses, e.g., classification loss 216, box regression loss 218.

A loss function 222 specific to object detection is formulated. Unlike conventional train-time calibration, the confidence and precision space is divided into four partitions and categorizes the true positive (TP) and false positive (FP) detections over a minibatch. The four partitions for TP and FP are: (1) accurate and confident (AC) (2) accurate and not confident (AN) (3) inaccurate and confident (IC) and (4) inaccurate and not confident (IN). Let $t_{AC}$, $t_{AN}$, $t_{IC}$ and $t_{IN}$ represent the number of detections in AC, AN, IC, and IN, respectively. In principle, accurate detections are needed to be more confident and inaccurate ones to be less confident, so define the following objective that should be maximized:

$$PC = \frac{t_{AC}+t_{IN}}{t_{AC}+t_{IN}+t_{AN}+t_{IC}} \tag{5}$$

In object detection, the obtained predictions are either accurate or inaccurate. Given the predicted class label, bounding boxes, 1 as an indicator function, and th is the threshold on score, define the following:

$$t_{AC} = \sum_{i}\mathbb{1}\big[[IoU(\bar{b}_i b_i)\geq\rho]\big]\mathbb{1}[[\bar{y}_i=y_i]]s_i\geq th \tag{6}$$

$$t_{AN} = \sum_{i}\mathbb{1}\big[[IoU(\bar{b}_i b_i)\geq\rho]\big]\mathbb{1}[[\bar{y}_i=y_i]]s_i< th \tag{7}$$

$t_{IC}$ & $t_{IN}$: The remaining detections after populating $t_{AC}$ and $t_{AN}$ are false positives (inaccurate). Similar to Eq. (6) and Eq. (7), categorize them based on their confidence scores.

In the loss formulation, precision is considered since it includes true positives and false positives, for which there are confidence scores. Whereas false negatives cannot be considered as they do not have confidence scores because of no detections. Since Eq. (5) is not differentiable owing to the indicator functions for $t_{AC}$, $t_{AN}$, $t_{IC}$ and $t_{IN}$, a differentiable version is formulated to approximate these quantities. Let $t_{AC}$, $t_{AN}$, $t_{IC}$ and $t_{IN}$ be the approximations to $t_{AC}$, $t_{AN}$, $t_{IC}$ and $t_{IN}$, respectively. The differentiable formulation can be expressed as:

$$t_{AC} = \sum_{i\in\binom{K_i=1\,\&}{\bar{s}_i\geq th}} \bar{s}_i\odot\tanh(\bar{s}_i)$$

$$t_{AN} = \sum_{i\in\binom{K_i=1\,\&}{\bar{s}_i\geq th}} \bar{s}_i\odot(1-\tanh(\bar{s}_i))$$

$$t_{IC} = \sum_{i\in\binom{K_i=0\,\&}{\bar{s}_i\geq th}} (1-\bar{s}_i)\odot\tanh(\bar{s}_i)$$

$$t_{IN} = \sum_{i\in\binom{K_i=0\,\&}{\bar{s}_i\geq th}} (1-\bar{s}_i\odot(1-\tanh(\bar{s}_i))$$

This is based on the rationale that when a detection is accurate, the confidence score satisfies to $\bar{s}\rightarrow1$, and otherwise $\bar{s}\rightarrow0$. Where tan h denotes the hyperbolic tangent function that modulates the penalty to the confidence score. The tan h function tapers off the confidence values in cases where the prediction is accurate so as to emphasize less on easy cases (well-calibrated) and focus more on the hard cases (not well-calibrated). Now the differentiable surrogate approximation to the auxiliary loss function can be defined:

$$\mathcal{L}_{BPC} = -\log\left(\frac{t_{AC}+t_{IN}}{t_{AC}+t_{IN}+t_{AN}+t_{IC}}\right) \tag{8}$$

This above relation Eq. (8) can be simplified as to minimize the following:

$$\mathcal{L}_{BPC} = \log\left(1+\frac{t_{AN}+t_{IC}}{t_{AC}+t_{IN}}\right) \tag{9}$$

Note that, the calibration loss $\mathcal{L}_{BPC}$ 222 is model-agnostic and differentiable and can be integrated with task specific losses of other object detection methods. Let $\mathcal{L}_{det}$ be the object detection loss 216, 218 that contains classification (e.g., Focal Loss) and localization (e.g., Generalized IoU &

L1) losses, add the $\mathcal{L}_{BPC}$ 222 to it and obtain the total loss as:

$$\mathcal{L}_{total} = \mathcal{L}_{det} + \mathcal{L}_{BPC} \qquad (10)$$

Since accurate predictions should have high confidence scores, the training-time loss has a goal to align higher accuracy with higher confidence scores and vice versa.

Figure 4A:
FIG. 4A illustrates a street view.
Figure 4B:
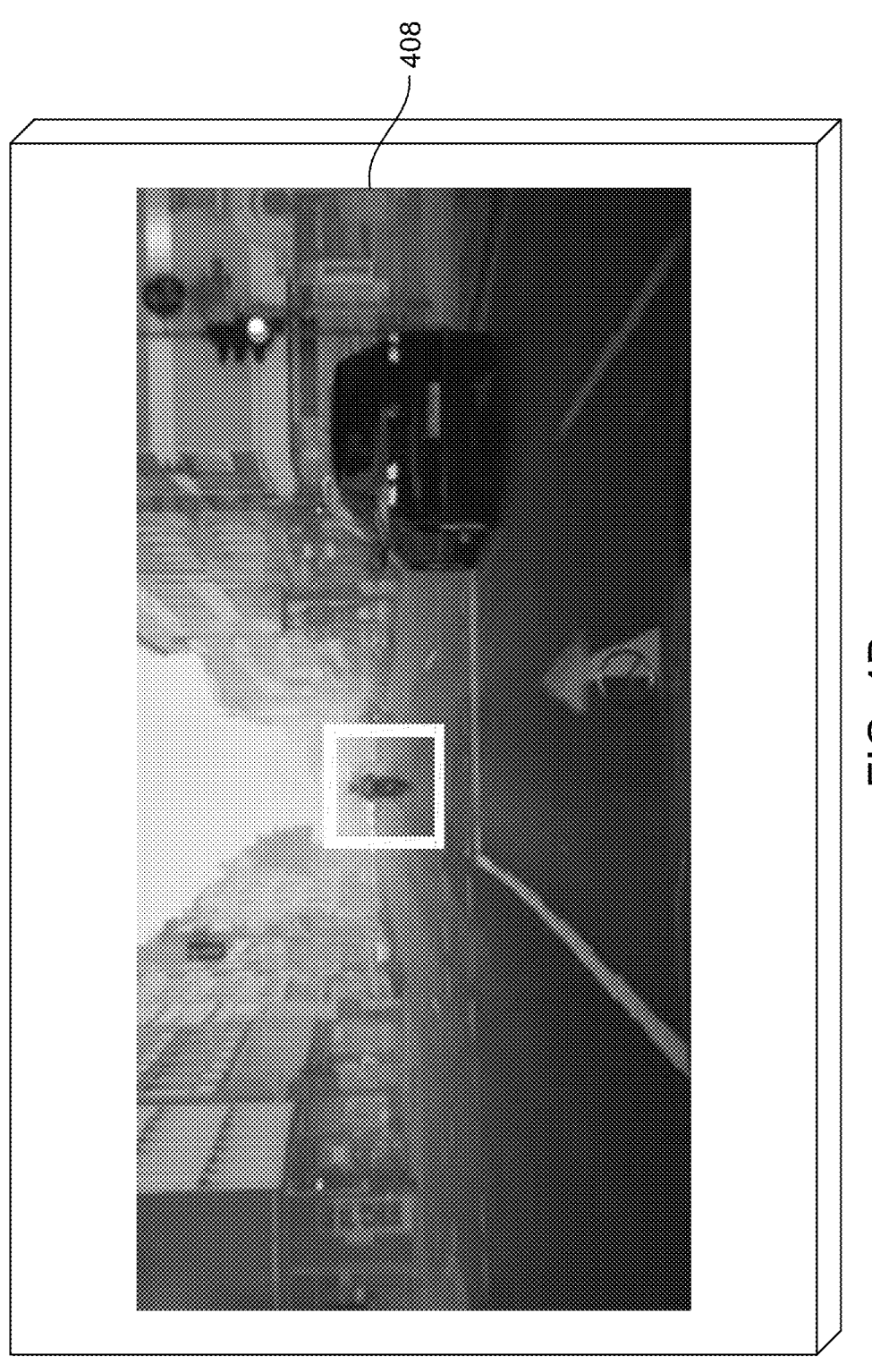
FIG. 4B illustrates a foggy street view.

FIG. 4A illustrates the confidence and precision space divided into four groups for categorizing accurate and inaccurate predictions over the minibatch according to their predicting confidence. The four groups of the confidence and precision space include accurate/confident, inaccurate/not-confident, accurate/not-confident, inaccurate/confident. As shown in FIG. 4B, compared to baseline, the disclosed BPC increases the joint count of accurate/confident and inaccurate/not-confident detections, while at the same time, it decreases the joint count of accurate/not-confident and inaccurate/confident detections. Further, when compared to the baseline, the ratio between the latter and the former (defined in Eq. (9)) is decreased.

EXAMPLES

In one embodiment, the disclosed computer vision system is utilized in an autonomous vehicle of Level 2 or above. An autonomous vehicle having a computer vision system is equipped with at least one camera. FIG. 4A illustrates a street view captured with a forward vehicle camera. FIG. 4B illustrates a foggy street view captured with a forward vehicle camera. A foggy view is used as an example of an out of domain dataset.

Figure 5:
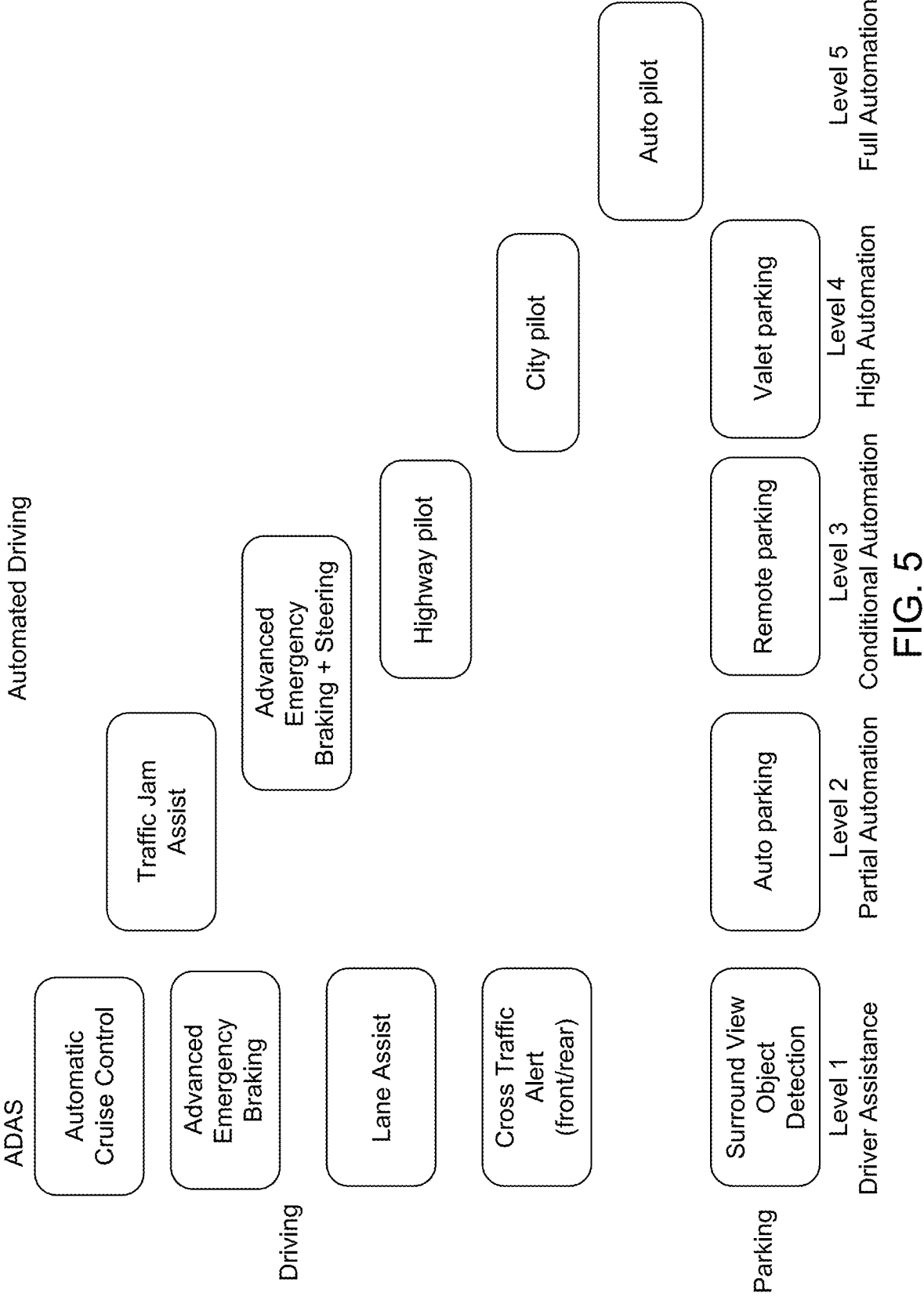
FIG. 5 is a diagram of levels of automation for vehicles.

FIG. 5 is a diagram of levels of automation for vehicles. Level 0 is momentary drive assistance, where a driver is fully responsible for driving the vehicle while system provides momentary driving assistance, like warnings and alerts, or emergency safety interventions. Level 1 is driver assistance, where the driver is fully responsible for driving the vehicle while system provides continuous assistance with either acceleration/braking or steering. Level 1 can include automatic cruise control, advanced emergency braking, lane assist, and cross traffic alert (front/read), as well as surround view object detection. Level 2 is additional driver assistance (partial automation), where the driver is fully responsible for driving the vehicle while system provides continuous assistance with both acceleration/braking and steering. Level 2 can include automatic parking. Level 3 is conditional automation, where the system handles all aspects of driving while driver remains available to take over driving if system can no longer operate. Level 4 is high automation, where when engaged, the system is fully responsible for driving tasks within limited service areas. A human driver is not needed to operate the vehicle. Level 5 is full automation (auto pilot), where when engaged, the system is fully responsible for driving tasks under all conditions and on all roadways. A human driver is not needed to operate the vehicle.

Figure 6:
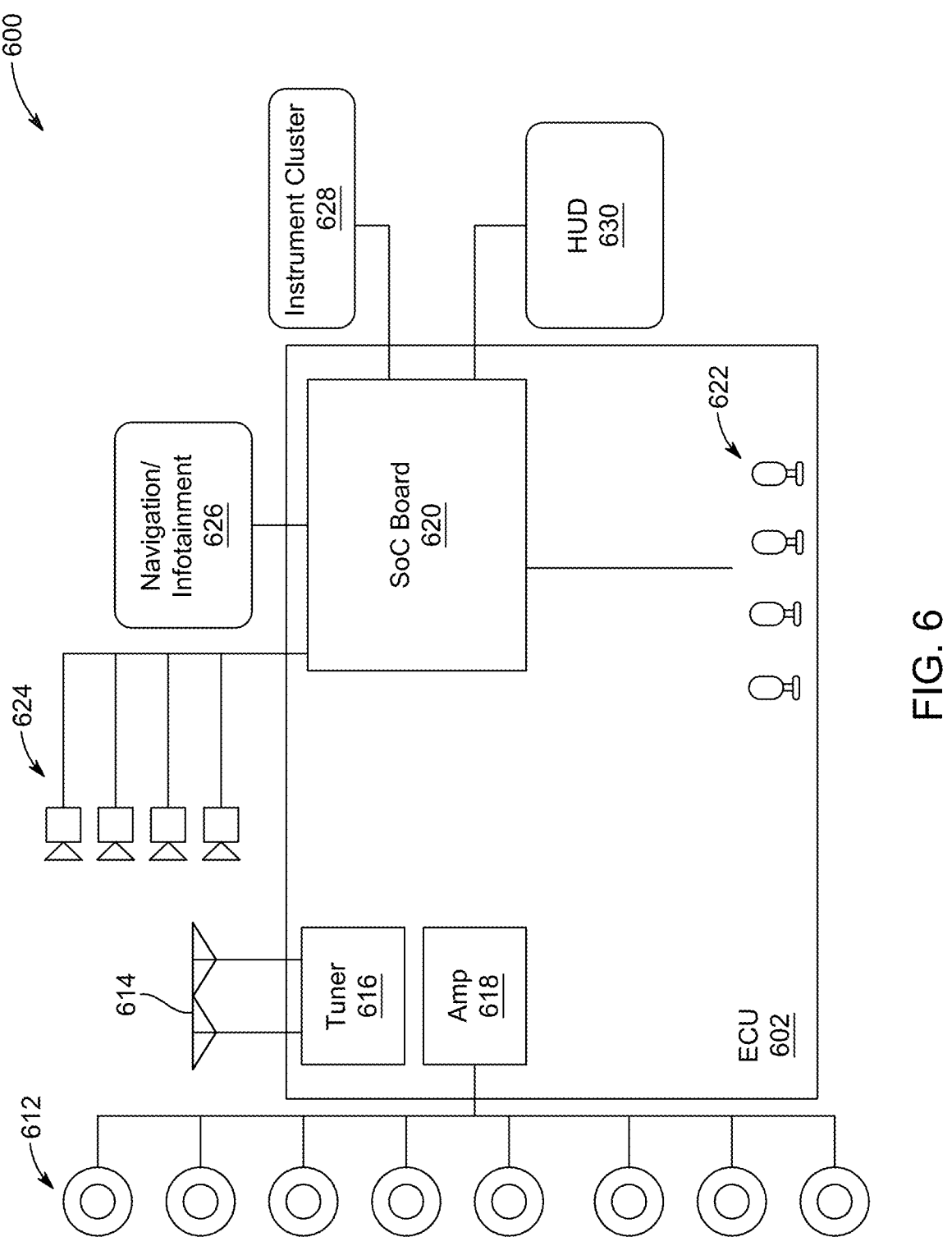
FIG. 6 is a block diagram of a control system for multi-sensor equipped vehicle.

FIG. 6 is a block diagram of a control system for multi-sensor equipped vehicle. The control system 600 includes sensors such as a number of radar sensors 612, antennas 614, video cameras 624, microphones 622. An electronic control unit (ECU) 602 can include a tuner 616 and Amp 618, and a system on chip (SoC) 620. The SoC 620 can be connected to a infotainment cluster 626, instrument cluster 628, and head up display (HUD) 630.

Figure 7:
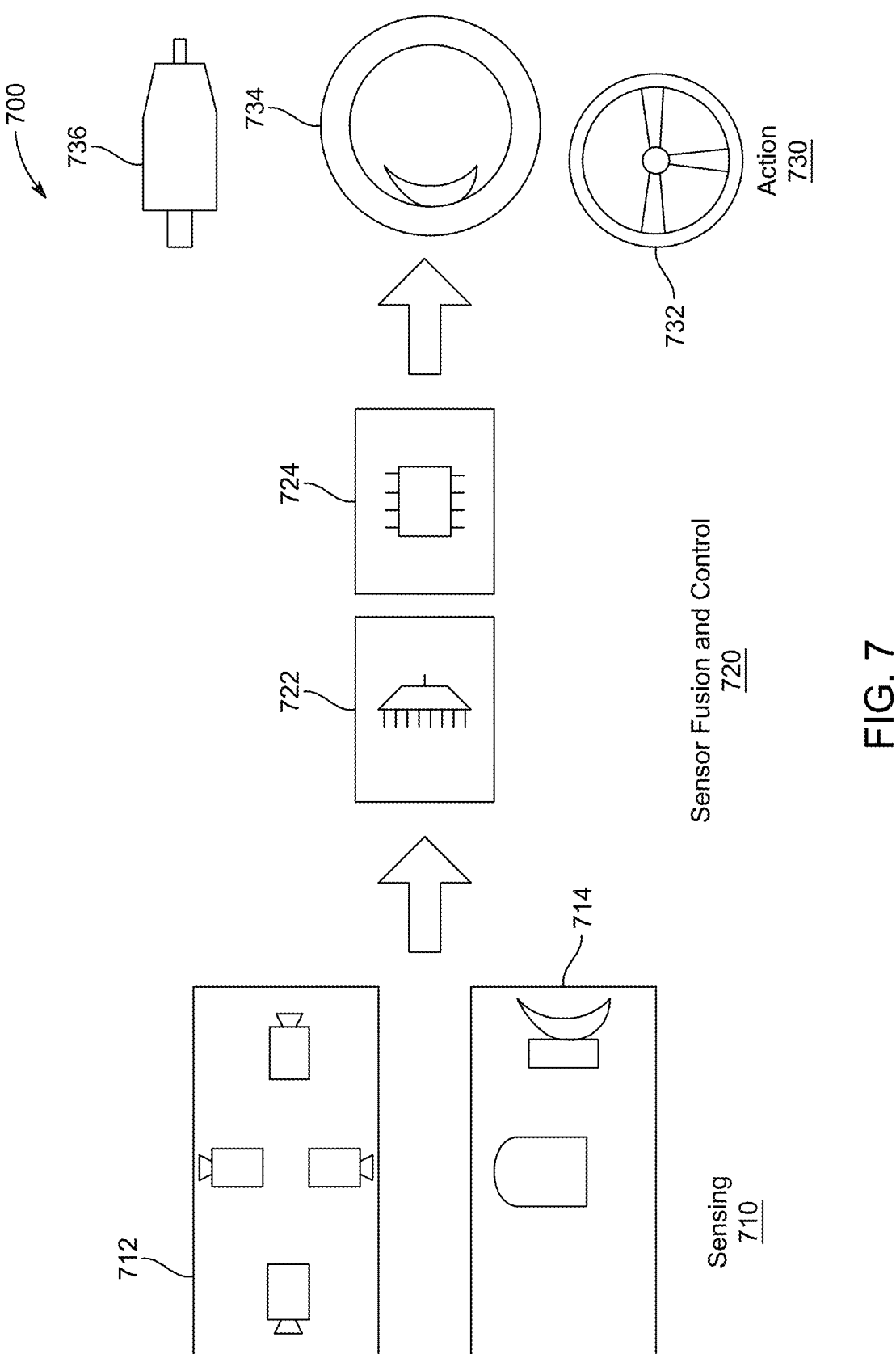
FIG. 7 is a system diagram of a control system for an autonomous vehicle.

FIG. 7 is a system diagram of a control system for an autonomous vehicle. An autonomous vehicle can include a sensing component 710, various actuators 730 controlled through sensor fusion and control 720. The sensing component 710 for a vehicle can include, but is not limited to, one or more cameras 712 mounted to the vehicle to provide an external view of the surrounding environment. Other sensors 714 may be mounted to the vehicle can include radar and sonar sensors, to name a few. A sensor fusion component 722 can collect input from sensors and synchronize signals so that they correspond in time. A controller 724 performs control operations based on the sensor inputs and can output actuation signals to actuators 730. Actuators 730 can include motion actuators for steering system 732, braking system 734, and transmission 736.

The controller 724 may send operation signals to the steering system 732, braking system 734, and transmission system 736, either independently or in combination. For example, in some vehicles, brakes and transmission may be operated in conjunction to control speed of the vehicle, such as slowing or accelerating the vehicle. Some vehicles may be equipped with driver assist features such as automatic parking that may involve control of steering and braking. In all control conditions, the controller 724 may monitor the environment to check for presence of objects and/or persons, and control motion of the vehicle accordingly, for purposes of safety and avoid vehicle damage.

Datasets: For both in-domain and out-domain scenarios, experiments are performed on various object detection datasets, including large-scale ones. MS-COCO contains 118K images for training as train2017, 41K as test2017, and 5K images as val2017, that are used for evaluation. See Tsung-Yi Lin, Michael Maire, Serge Belongie, James Hays, Pietro Perona, Deva Ramanan, Piotr Dollár, and C Lawrence Zitnick. Microsoft coco: Common objects in context. In *European conference on computer vision*, pages 740-755. Springer, 2014, incorporated herein by reference in its entirety. It consists of 80 object categories in real world images. CorCOCO is a corrupted version of MS-COCO val2017 dataset for evaluations in out-domain scenarios. It incorporates random corruptions out of specified settings with arbitrary severity levels. See Dan Hendrycks and Thomas Dietterich. Benchmarking neural network robustness to common corruptions and perturbations. *International Conference on Learning Representations (ICLR)*, 2019, incorporated herein by reference in its entirety. Cityscapes is an urban driving scene dataset consisting of 8 categories: person, rider, car, truck, bus, train, motorbike, and bicycle. See Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In *Proc. of the IEEE Conference on Computer Vision and Pattern Recognition (CVPR)*, 2016, incorporated herein by reference in its entirety. It contains 2975 training images and 500 validation images used for evaluation. Foggy Cityscapes consists of images simulating foggy weather on Cityscapes, and its validation set with severe level of fog is used for evaluation for out-domain scenario. See Christos Sakaridis, Dengxin Dai, and Luc Van Gool. Semantic foggy scene understanding with synthetic data. *International Journal of Computer Vision*, 126(9):973-992, 2018, incorporated herein by reference in its entirety. Sim10k is a dataset of synthetic images containing car category. See Matthew Johnson-Roberson, Charles Barto, Rounak Mehta, Sharath Nittur Sridhar, Karl Rosaen, and Ram Vasudevan. Driving in the matrix: Can virtual worlds replace human-generated annotations for real world tasks? In 2017 *IEEE International Conference on Robotics and Automation (ICRA)*, pages 746-753. IEEE, 2017, incorporated herein by reference in its entirety. It contains 10K images from which 8K are split as training set and 1K is used for evaluation. BDD100k consists of 70K training images, 20K test images and 10K validation images. See Fisher Yu, Haofeng Chen, XinWang, Wenqi Xian, Yingying Chen, Fangchen Liu, Vashisht Madhavan, and Trevor Darrell. Bdd100k: A diverse driving dataset for heterogeneous multitask learning. In *Proceedings of the IEEE/CVF conference on computer vision and pattern recognition*, pages 2636-2645, 2020, incorporated herein by reference in its entirety. Only consider daylight subset of validation set for the evaluation of out-domain scenario which counts to 5.2K images. This dataset contains class categories similar to Cityscapes.

Datasets (post-hoc): Validation sets are used based on three in-domain scenarios for temperature scaling as a post-hoc method. Object365 validation dataset is used in case of MS-COCO with similar categories, subset of BDD100k train set for Cityscapes and for Sim10k, its validation split. See Shuai Shao, Zeming Li, Tianyuan Zhang, Chao Peng, Gang Yu, Xiangyu Zhang, Jing Li, and Jian Sun. Objects365: A large-scale, high-quality dataset for object detection. In 2019 *IEEE/CVF International Conference on Computer Vision (ICCV)*, pages 8429-8438, 2019, incorporated herein by reference in its entirety.

Figure 8:
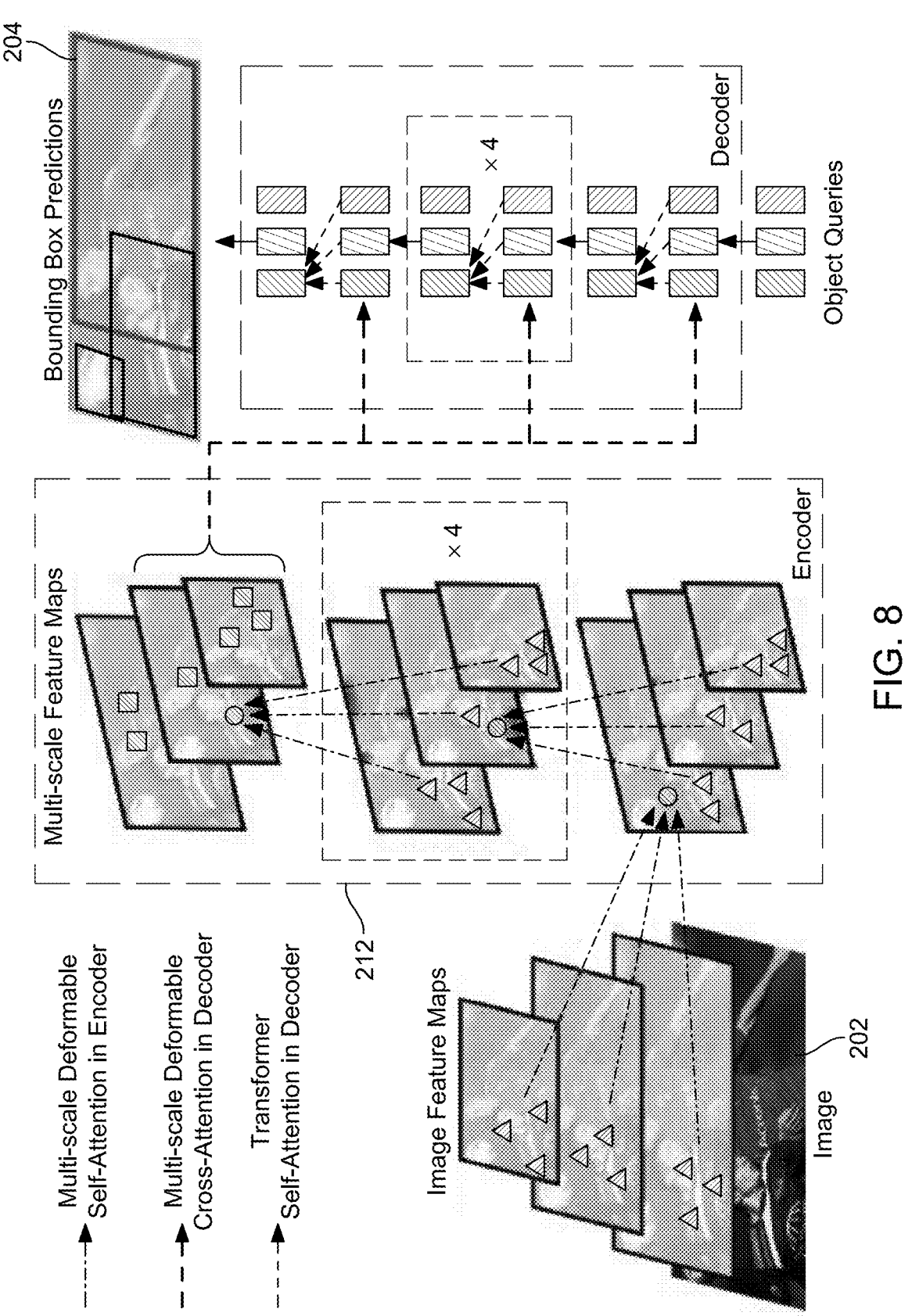
FIG. 8 is a block diagram of a Deformable DETR object detector as an exemplary network architecture.

Any state of the art (SoTA) object detector, such as the Deformable-DETR (D-DETR), can be used as a baseline. In one embodiment, the loss function 222 is integrated with the object detector 212, 214. FIG. 8 is a block diagram of a Deformable DETR object detector as an exemplary network architecture. D-DETR uses focal loss for classification 216 and generalized IOU & L1 losses for localization 218. See Tsung-Yi Lin, Priya Goyal, Ross Girshick, Kaiming He, and Piotr Dollár. Focal loss for dense object detection. In *Proceedings of the IEEE international conference on computer vision*, pages 2980-2988, 2017; and Nicolas Carion, Francisco Massa, Gabriel Synnaeve, Nicolas Usunier, Alexander Kirillov, and Sergey Zagoruyko. End-to-end object detection with transformers. In Andrea Vedaldi, Horst Bischof,

1. Results

Extensive experiments are performed with post-hoc method and recent training-time losses over various in-domain and out-domain scenarios. For post-hoc method, a validation set is needed and for temperature scaling (TS) optimize calibration parameter T. All of these methods are compared with the disclosed loss function, specifically designed for object detectors. Results show significant improvement over calibration scores (lower the better), while having comparable performance in detection accuracy.

Figure 9:
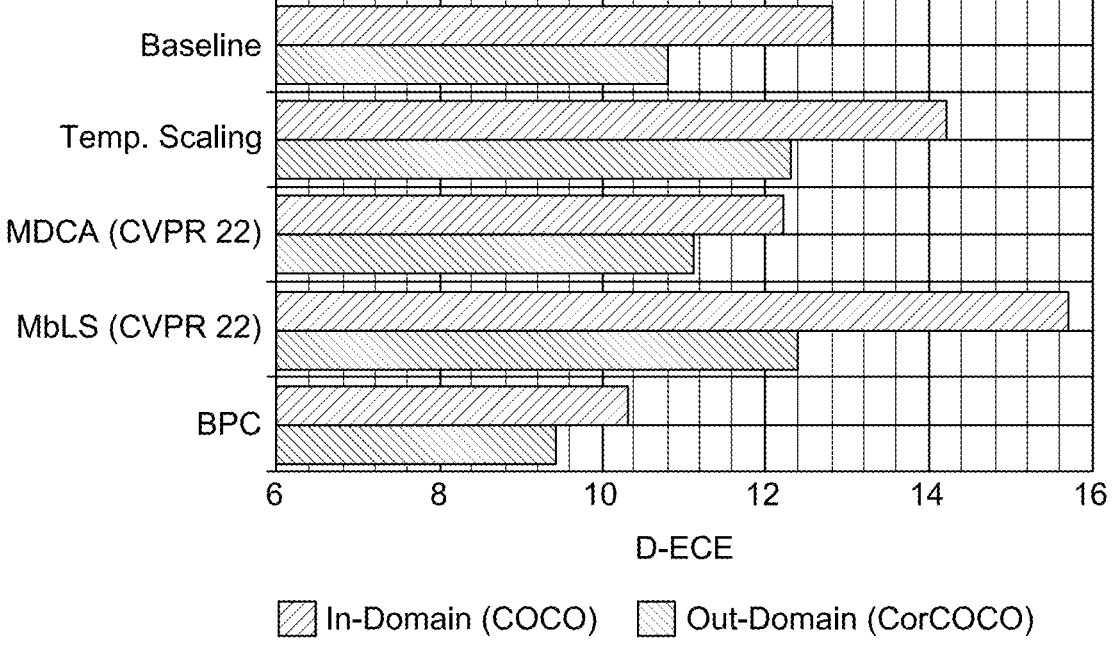
FIG. 9 illustrates that the BPC loss reduces D-ECE for MS-COCO in-domain and Cor-COCO out-domain.

Real and Corrupted domains: To see the effectiveness of the loss, experiments are performed with a large-scale benchmark dataset, MS-COCO. FIG. 9 illustrates that the BPC loss reduces D-ECE for MS-COCO in-domain and CorCOCO out-domain. It is noted that the classification calibration losses are sub-optimal for detection calibration and the disclosed BPC loss improves calibration over post-hoc and train-time losses.

The results for in-domain and out-domain scenarios are shown. That a corrupted version of the MS-COCO (Cor-COCO) validation set is used for out-domain evaluation. In Table. 1, the post-hoc based TS method fails to improve calibration in both domains, that usually considered to be a good performer in the in-domain. Results show train time losses that are designed for classification-based model calibration, are also not ideal for the calibration of object detectors. Report D-ECE, and the disclosed loss function shows improvement in calibration scores for both in-domain ($\rightarrow$COCO, 2.5% $\downarrow$) and out-domain ($\rightarrow$CorCOCO, 1.4% $\downarrow$) scenarios from the baseline (FIG. 8). In comparison with MbLS, the loss improves calibration scores of 5.4%$\downarrow$ and 3.0% $\downarrow$ for in-domain and out-domain respectively.

Table 1. Calibration performance on COCO in-domain and out-domain scenarios. Results show that the disclosed BPC improves calibration of object detection as compared to baseline, other train time losses and post-hoc methods. AP box and mAP (@0.5 are also reported in the table.

TABLE 1

| Methods | Scenarios | | | | | |
| | In-Domain (COCO) | | | Out-Domain (CorCOCO) | | |
| | D-ECE$\downarrow$ | AP box | mAP@0.5 | D-ECE$\downarrow$ | AP box | mAP@0.5 |
|---|---|---|---|---|---|---|
| Baseline | 12.8 | 44.0 | 62.9 | 10.8 | 23.9 | 35.8 |
| TS (post-hoc) | 14.2 | 44.0 | 62.9 | 12.3 | 23.9 | 35.8 |
| MDCA | 12.2 | 44.0 | 62.9 | 11.1 | 23.5 | 35.3 |
| MbLS | 15.7 | 44.4 | 63.4 | 12.4 | 23.5 | 35.3 |
| BPC (Ours) | 10.3 | 43.7 | 62.8 | 9.4 | 23.2 | 34.9 |

Thomas Brox, and Jan-Michael Frahm, editors, *Computer Vision—ECCV*, 2020, each incorporated herein by reference in their entirety. Default settings are used and more details can be seen in Zhu et al. In addition to the comparison of the disclosed training-time loss with post-hoc method, also compare calibration performance with recent calibration losses, MDCA and MbLS. D-DETR is trained with respective train-time losses and in-domain datasets.

Evaluation: For both in-domain and out-domain, detection expected calibration error (D-ECE) is reported as an object detection calibration measure along with mean average precision of detectors.

Weather domains: A weather shift scenario is considered for evaluation in both domains. For in-domain Cityscapes (CS) and out-domain Foggy CS, it can be seen in Table. 2 that the loss shows improvement over post-hoc, for both in-domain ($\rightarrow$CS, 2.7%$\downarrow$) and out-domain ($\rightarrow$Foggy CS, 2.1% $\downarrow$). Also, improvement is shown as compared to train-time losses, notably ($\rightarrow$Foggy CS, 7.5% $\downarrow$) over MbLS.

Table 2. Calibration results with baseline, train-time losses and post-hoc methods are reported. BPC shows improvement in detection calibration for all the scenarios of in-domain (Cityscapes) and out-domain (Foggy Cityscapes & BDD100k). AP box and mAP@0.5 are also reported for each scenario.

Detector trained with the loss forces the accurate predictions to be more confident whereas inaccurate predictions to be less confident.

TABLE 2

| Methods | Scenarios | | | | | | | | |
|---|---|---|---|---|---|---|---|---|---|
| | In-Domain (Cityscapes) | | | Out-Domain (Foggy Cityscapes) | | | Out-Domain (BDD100k) | | |
| | D-ECE↓ | AP box | mAP@0.5 | D-ECE↓ | AP box | mAP@0.5 | D-ECE↓ | AP box | mAP@0.5 |
| Baseline | 13.8 | 26.8 | 49.5 | 19.5 | 17.3 | 29.3 | 11.7 | 10.2 | 21.9 |
| TS (post-hoc) | 12.6 | 26.8 | 49.5 | 14.6 | 17.3 | 29.3 | 24.5 | 10.2 | 21.9 |
| MDCA | 13.4 | 27.5 | 49.5 | 17.1 | 17.7 | 30.3 | 14.2 | 10.7 | 22.7 |
| MbLS | 12.1 | 27.3 | 49.7 | 20.0 | 17.1 | 29.1 | 11.6 | 10.5 | 22.7 |
| BPC (Ours) | 9.9 | 26.8 | 48.7 | 12.5 | 17.7 | 30.2 | 10.6 | 11.0 | 23.6 |

Figure 10:
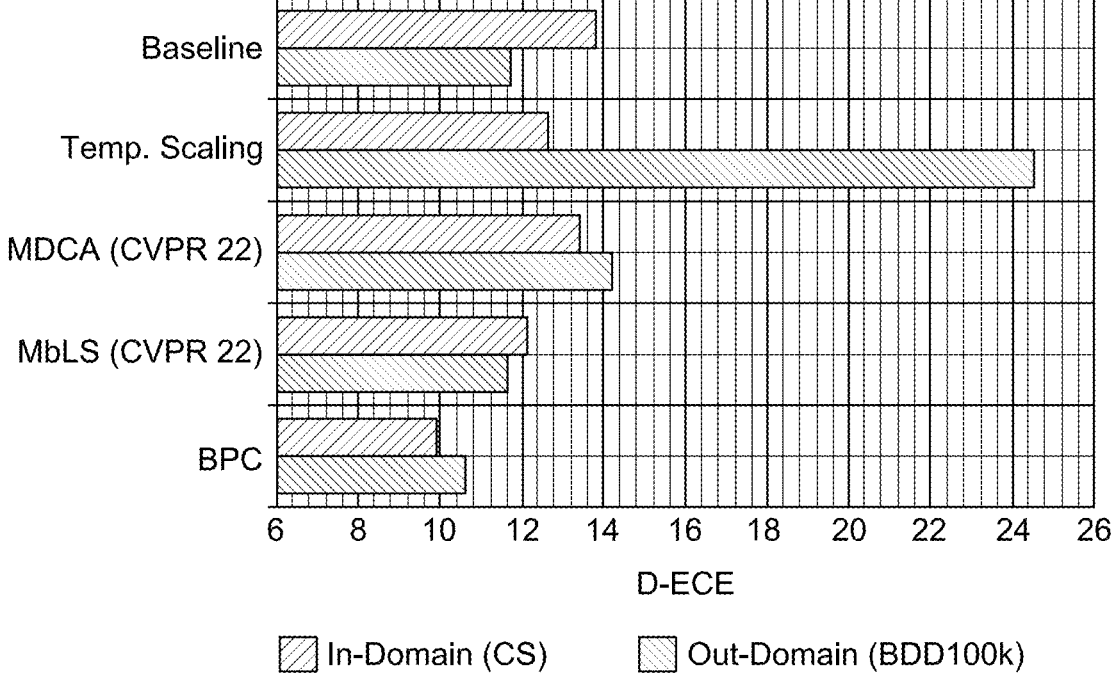
FIG. 10 illustrates that after integrating the BPC loss the calibration performance is improved in Cityscapes (CS) and CS to BDD100k.

Scene domains: To have CS as in-domain in scene shift, BDD100k is evaluated as an out-domain scenario. Both belong to urban driving scenes but there is a large scene deviation among them. FIG. 10 illustrates that after integrating the BPC loss the calibration performance is improved in Cityscapes (CS) and CS to BDD100k. Results are shown in this scenario in Table 2 and find that TS performs the worst, followed by classification-based train time losses. The disclosed model outperforms TS in out-domain (→BDD100k, 13.9%↓) and the recent MDCA (→BDD100k, 3.6%↓) approach.

Figure 11:
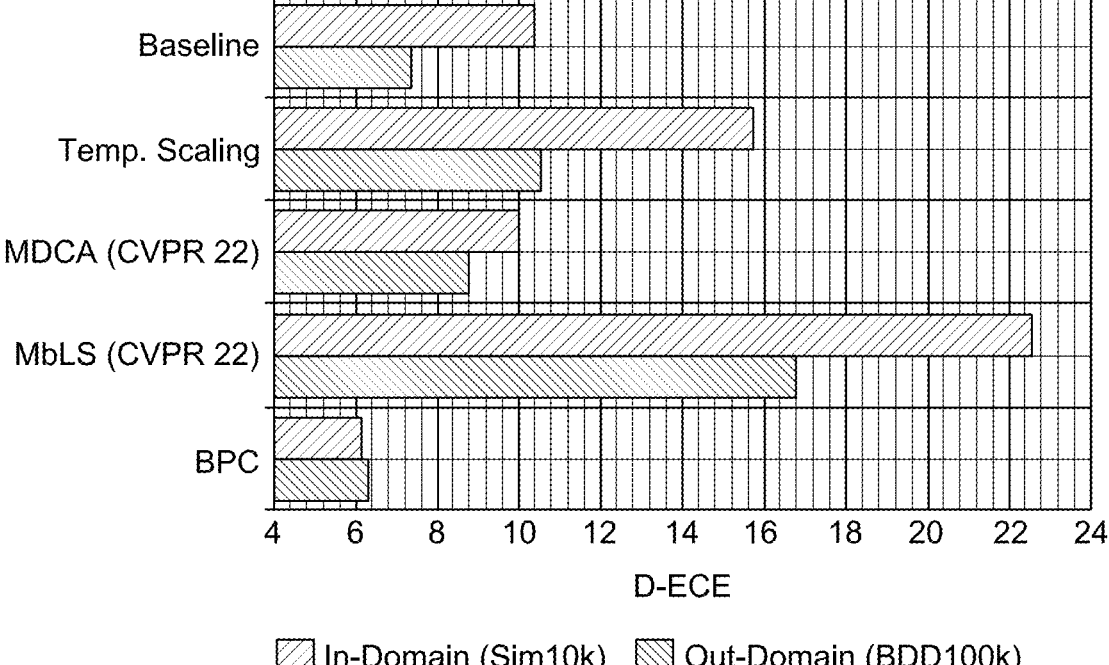
FIG. 11 illustrates that the BPC loss reduces D-ECE in Sim10k and BDD100k as in-domain and out-domain scenarios, respectively.

Synthetic and Real domains: Sim10k is a synthetic dataset and considered as in-domain, while BDD100k as a daylight subset is considered as out-domain. The car category is extracted from the BDD100k evaluation set and report the results. FIG. 11 illustrates that the BPC loss reduces D-ECE in Sim10k and BDD100k as in-domain and out-domain scenarios, respectively. The loss shows improved calibration scores for in-domain (→Sim10k, 3.9% ↓) and out-domain (→BDD100k, 2.5% ↓) scenarios over the MDCA loss. Also calibration improvement of 16.4%↓ and 10.5%↓ over MbLS for in-domain and out-domain respectively (Table. 3).

Table 3. Calibration performance with the disclosed BPC loss is improved over baseline, train-time losses and post-hoc methods for both in-domain (Sim10k) and out-domain (BDD100k). Car class is considered in this scenario for evaluations. AP box and mAP@0.5 are also reported.

Figures 13A, 13B, 13C, 13D:
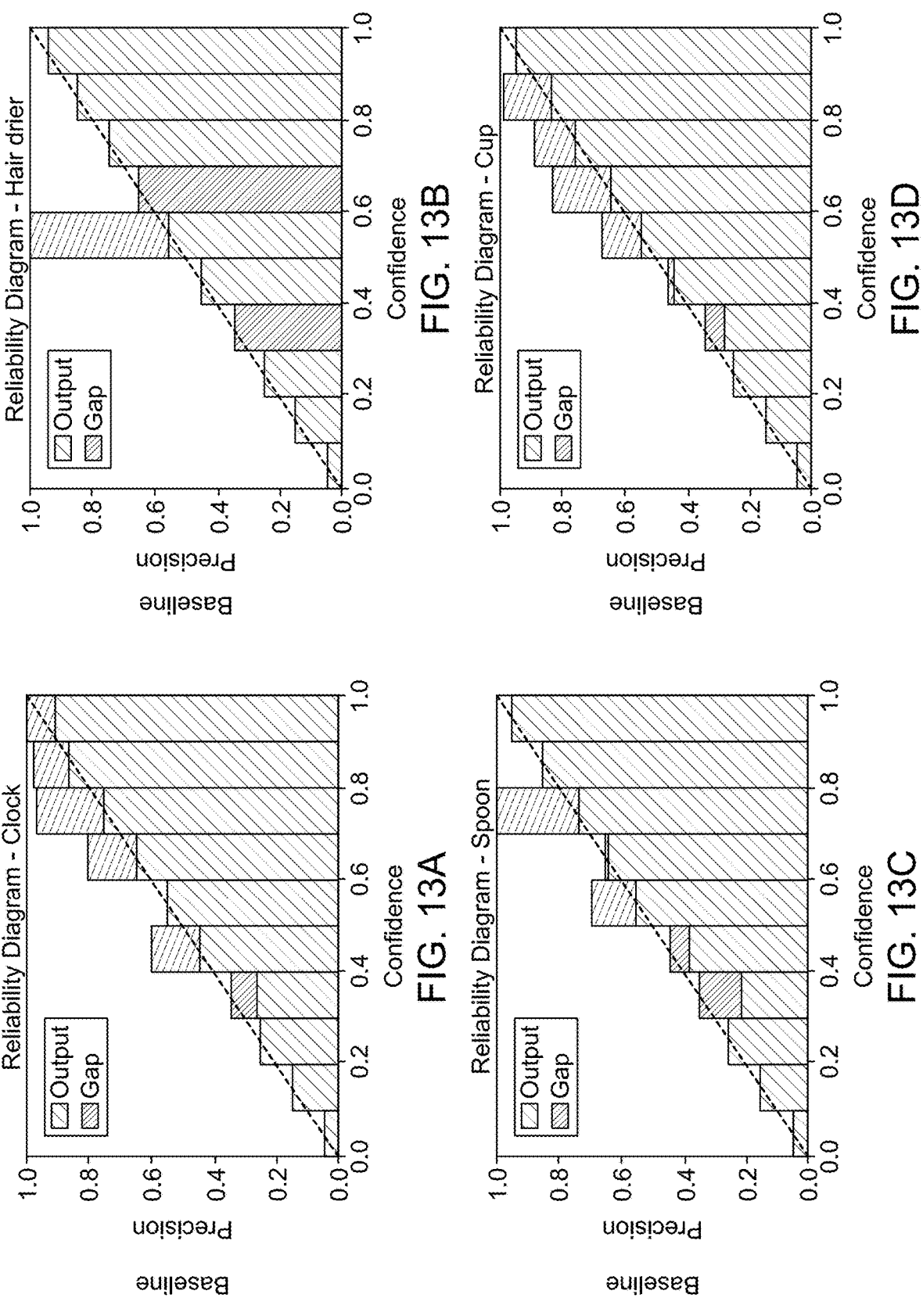
FIGS. 13A-13N illustrate Reliability Diagrams for MS-COCO (In-Domain) and CorCOCO (Out-Domain)
Figures 13E, 13F, 13G:
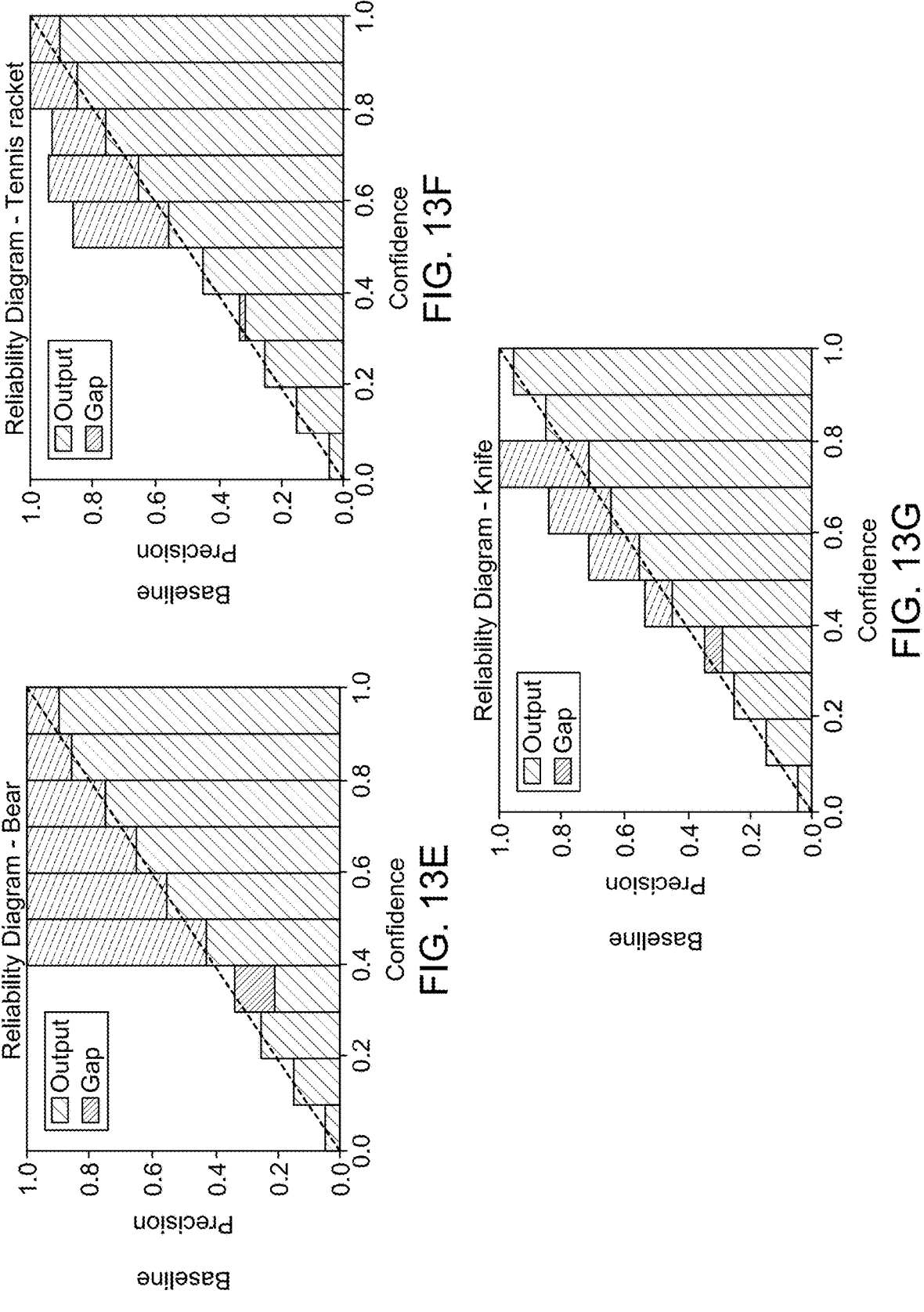
Figures 13H, 13I, 13J, 13K:
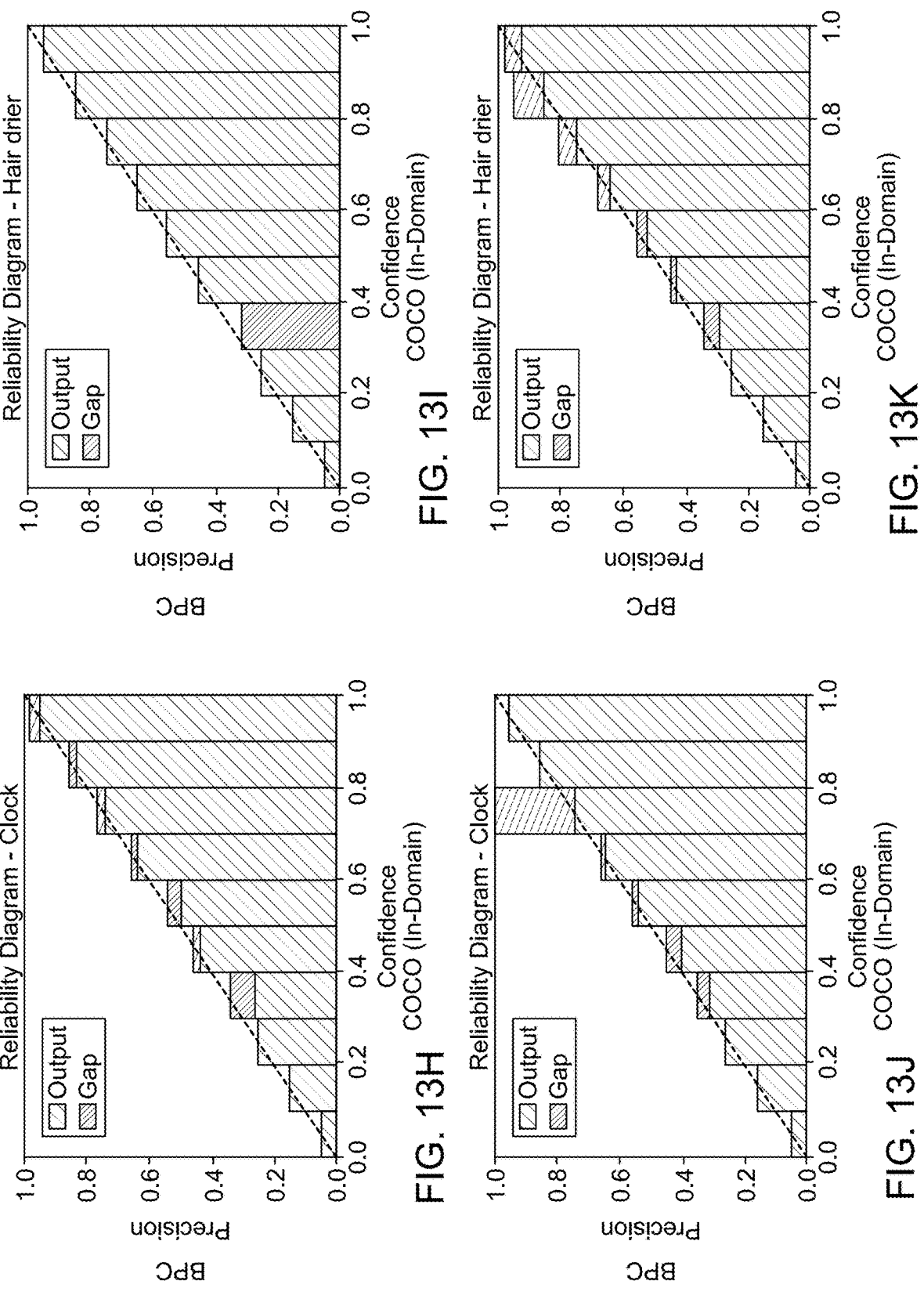
Figures 13L, 13M, 13N:
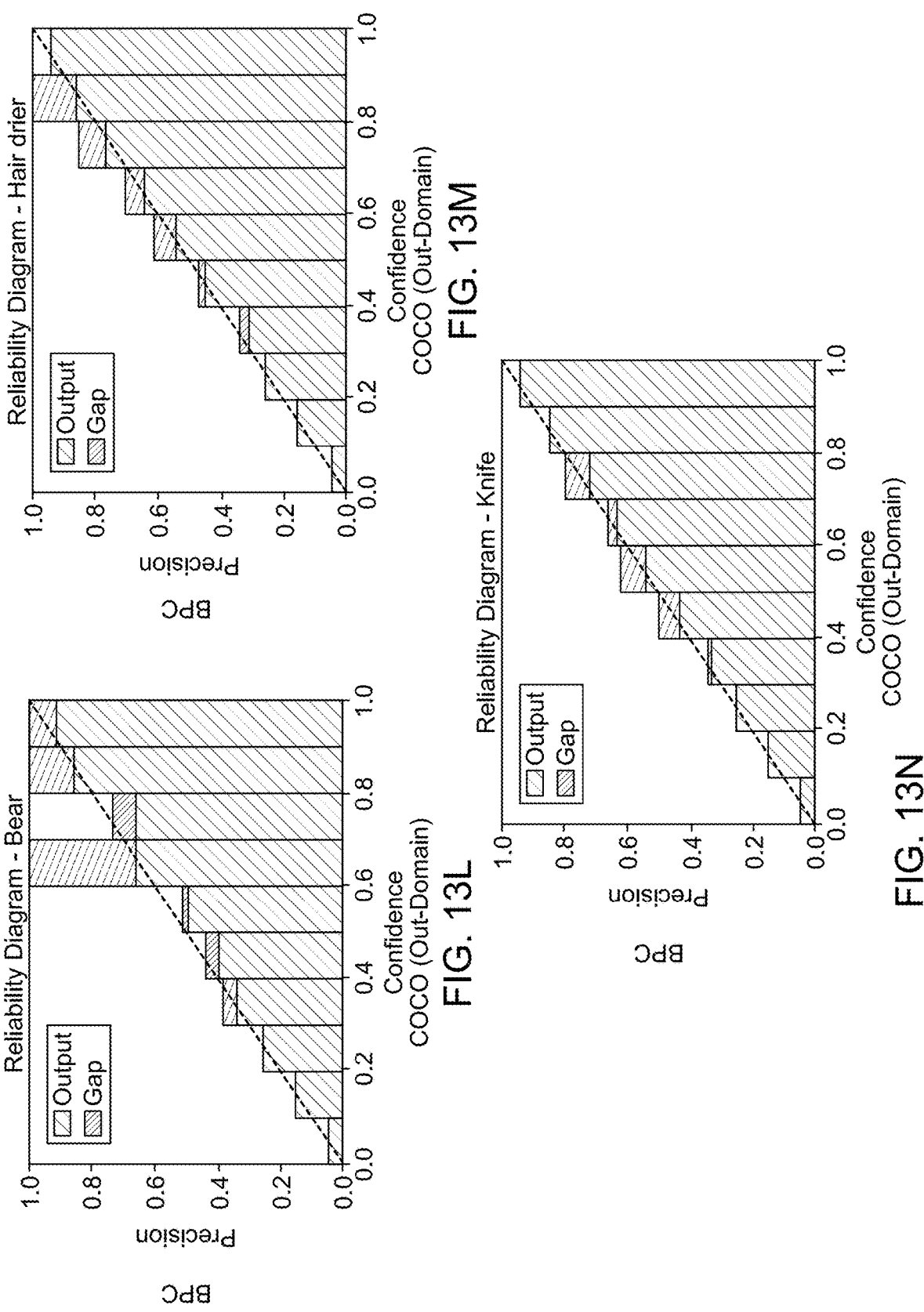

Reliability Diagrams: FIGS. 13A-13N are Reliability Diagrams showing the behavior of calibration. The diagrams show MS-COCO (In-Domain) and CorCOCO (Out-Domain). The Baseline row FIG. 13A-13G is trained as D-DETR and BPC row FIG. 13H-13N D-DETR is trained with the BPC loss. A perfect calibration is achieved if the confidence is exactly same as precision.

Ablation & Analysis

Ablation studies are performed on score threshold, batch sizes and random initialization. For this purpose, select the subsets of Sim10k training set as train and validation to empirically find score threshold hyper-parameter. With similar data splits, impact of batch sizes and random weight initialization is shown on the loss.

Score Threshold: Study the impact of score threshold that is used for penalizing the probabilities of instances present in the batch. Varying the score threshold shows some degradation in detection performance for in-domain but calibration still stands out the best and the approach is not much sensitive to it. It has empirically been found in Table. 4 that th=0.5 improves calibration.

Table 4. Impact of probability thresholds on BPC loss. Experiments are performed using train and test subsets of Sim10k train set for ablation study.

TABLE 3

| Methods | Scenarios | | | | | |
|---|---|---|---|---|---|---|
| | InDomain (Sim10k) | | | OutDomain (BDD100k) | | |
| | D-ECE↓ | AP box | mAP@0.5 | D-ECE↓ | AP box | mAP@0.5 |
| Baseline | 10.3 | 65.9 | 90.7 | 7.3 | 23.5 | 46.6 |
| TS (post-hoc) | 15.7 | 65.9 | 90.7 | 10.5 | 23.5 | 46.6 |
| MDCA | 10.0 | 64.8 | 90.3 | 8.8 | 22.7 | 45.7 |
| MbLS | 22.5 | 63.8 | 90.5 | 16.8 | 23.4 | 47.4 |
| BPC (Ours) | 6.1 | 65.4 | 90.5 | 6.3 | 23.4 | 45.6 |

Figure 12A:
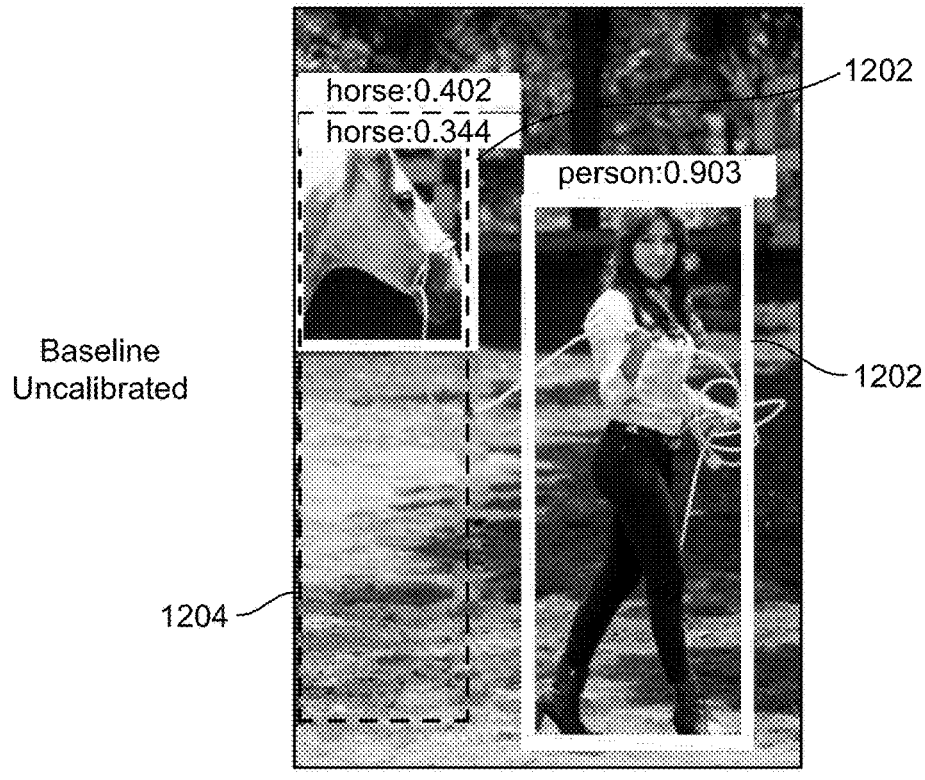
FIGS. 12A-12T illustrate a baseline vs. the BPC.
Figure 12B:
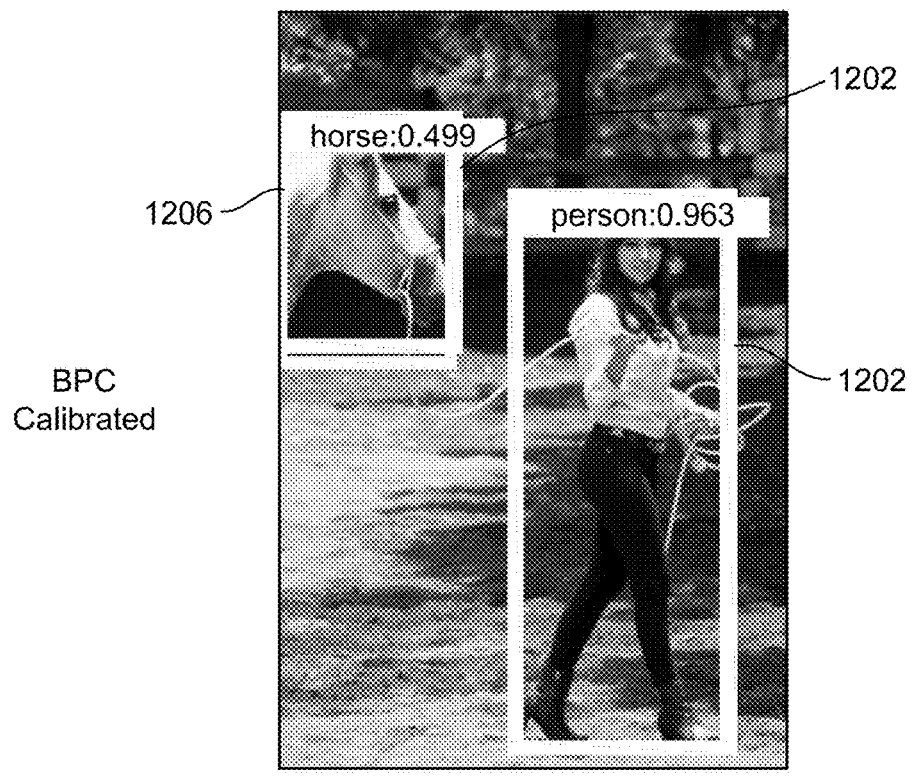
Figure 12C:
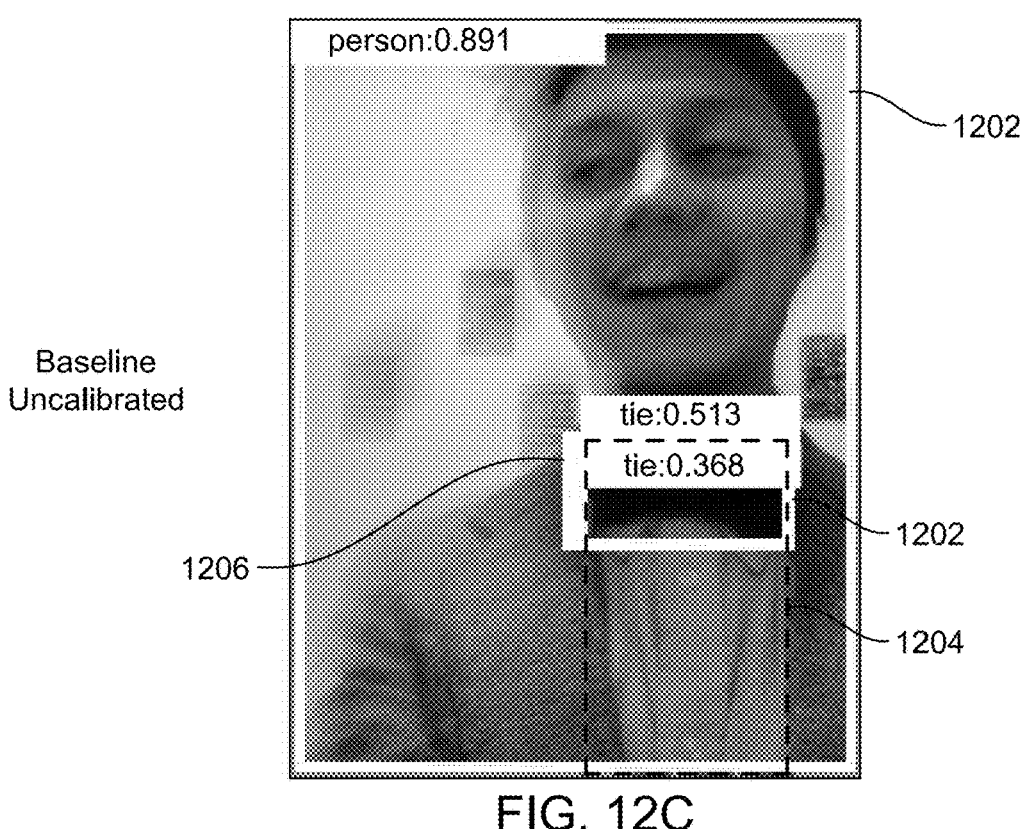
Figure 12D:
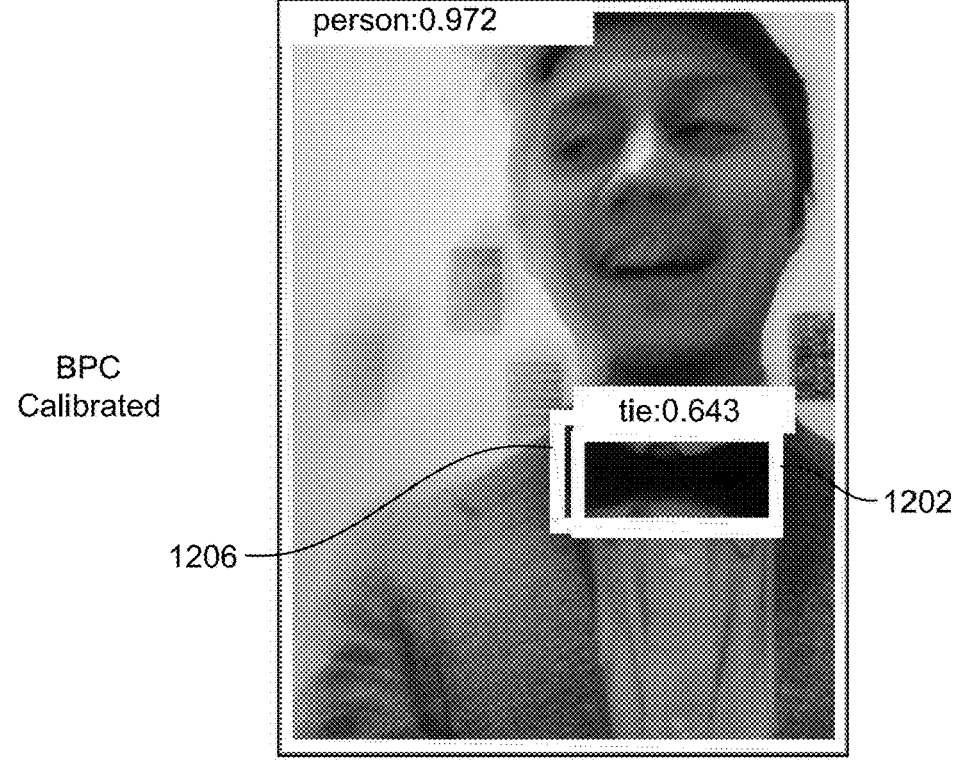
Figure 12E:
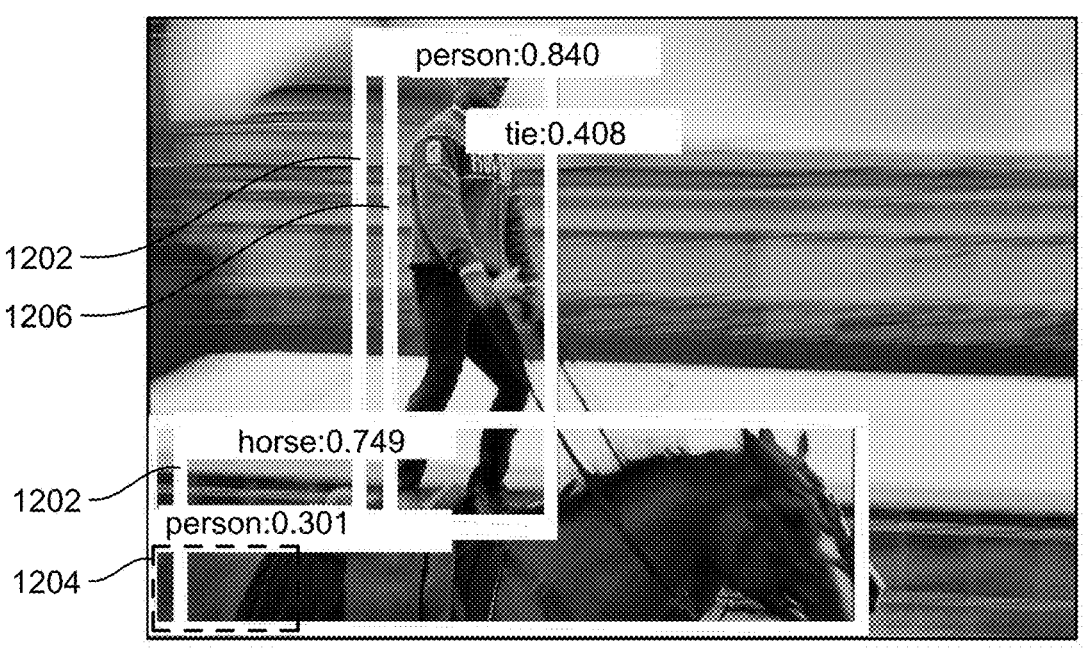
Figure 12F:
Figures 12G, 12H:
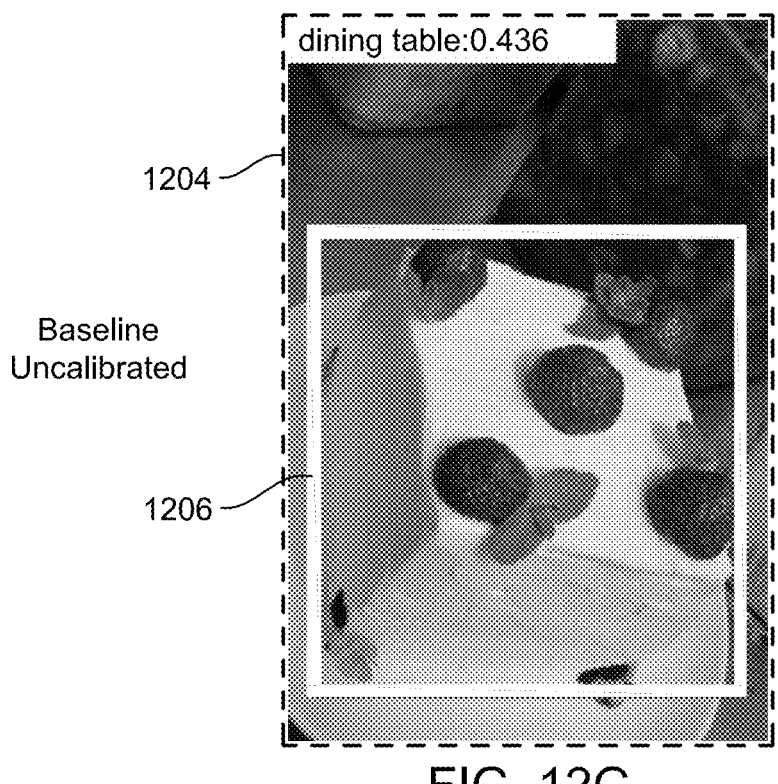
Figure 12I:
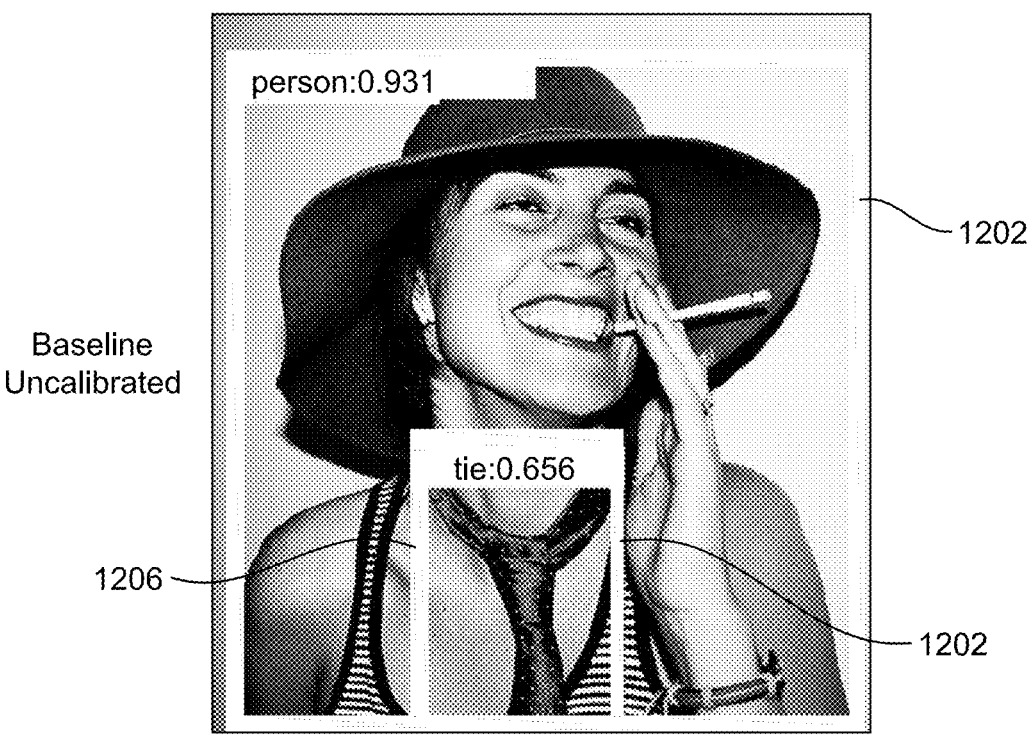
Figure 12J:
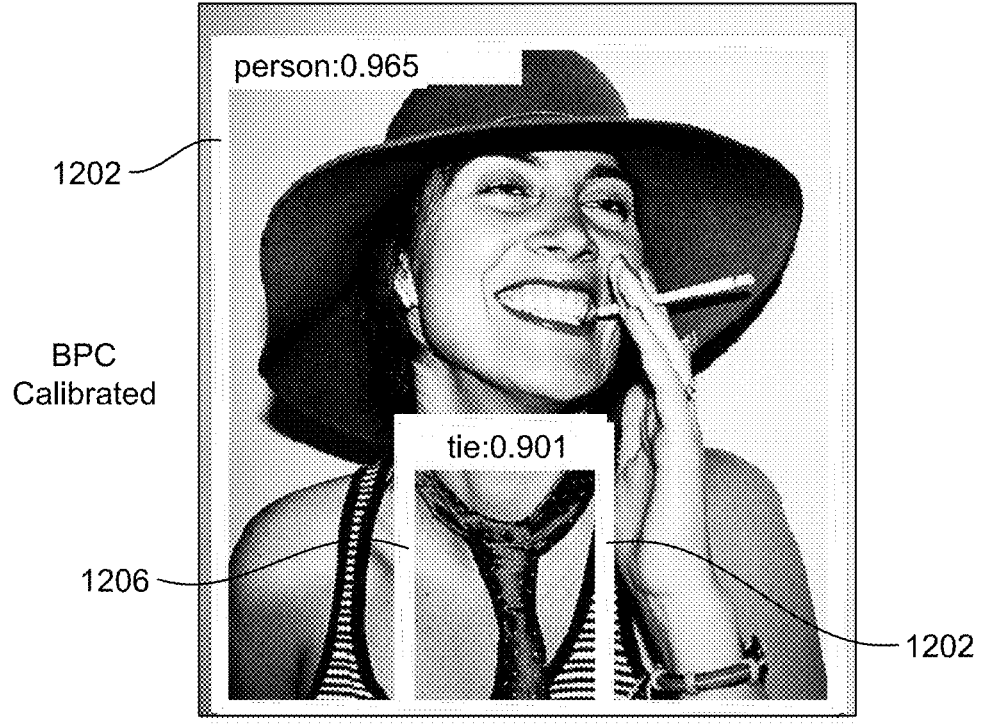
Figure 12K:
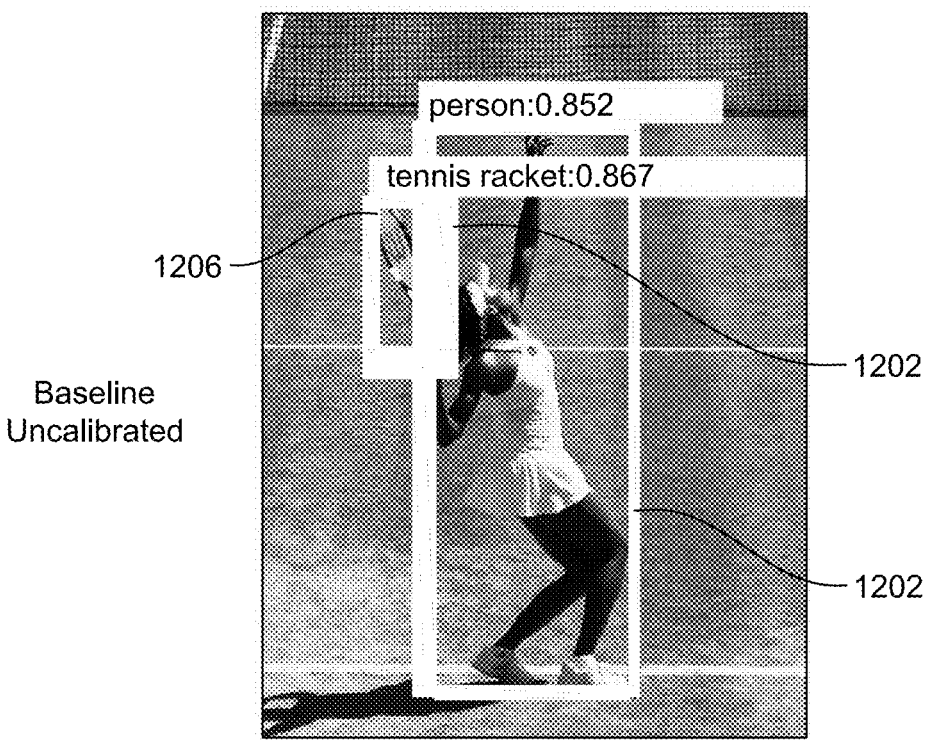
Figure 12L:
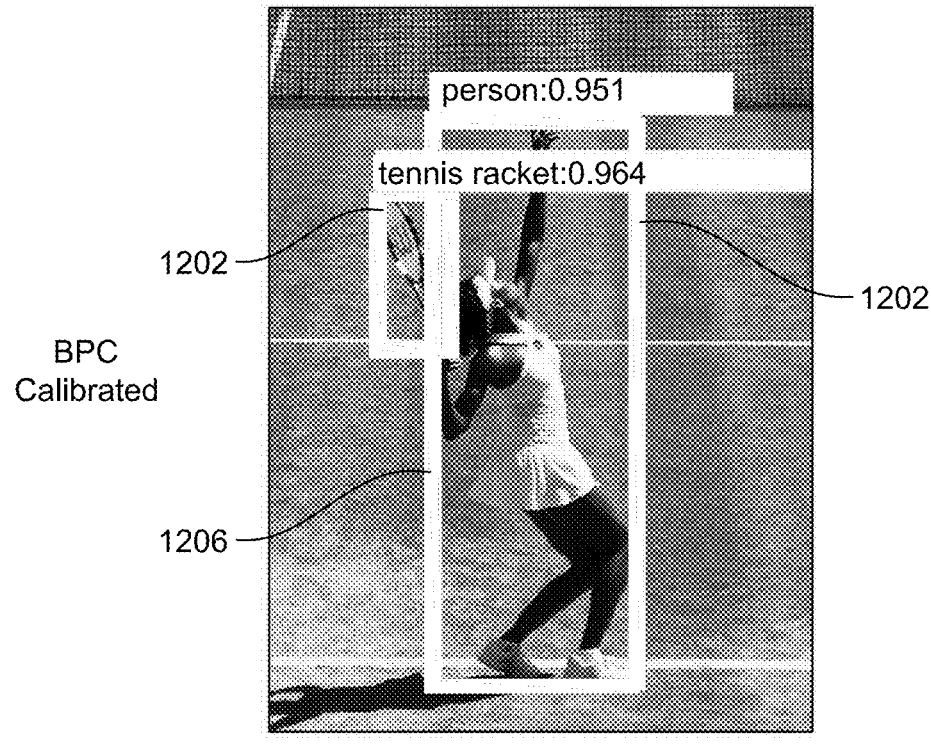
Figure 12M:
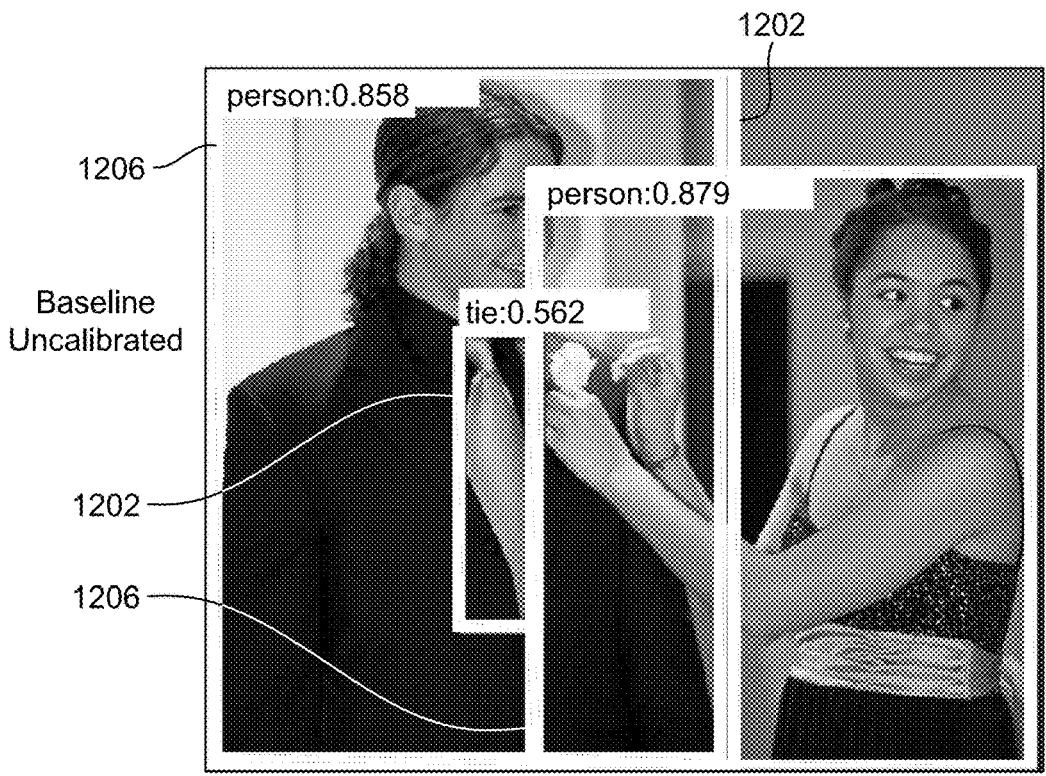
Figure 12N:
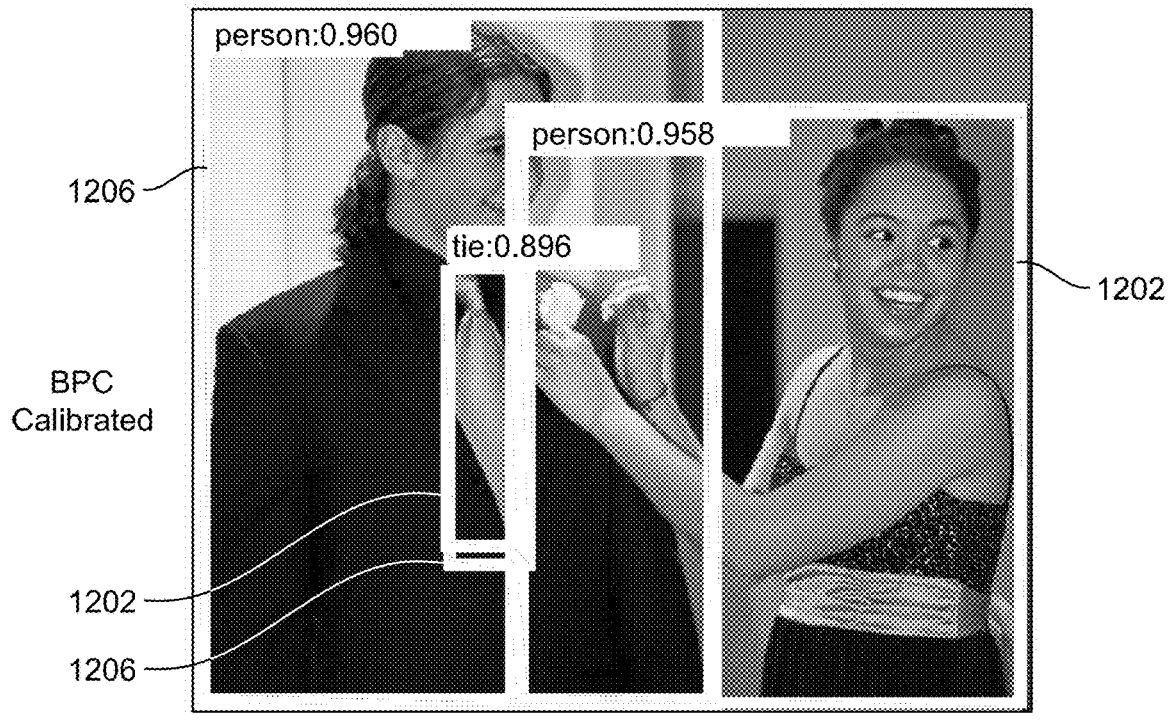
Figure 12O:
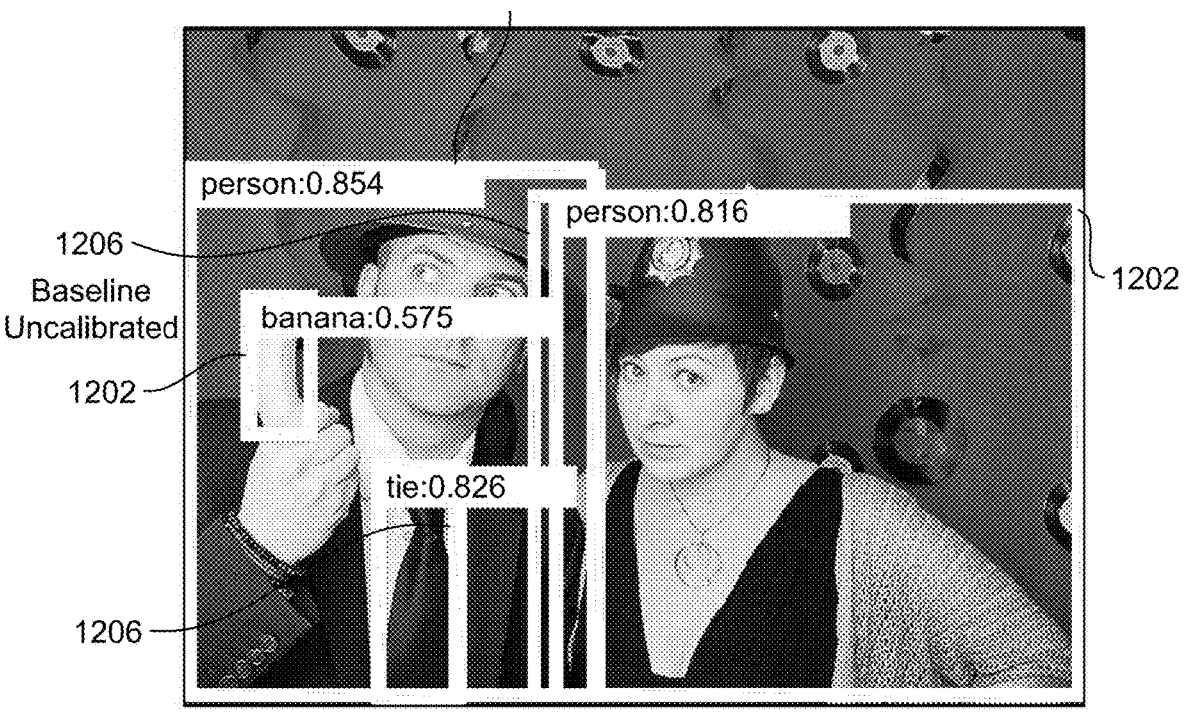
Figure 12P:
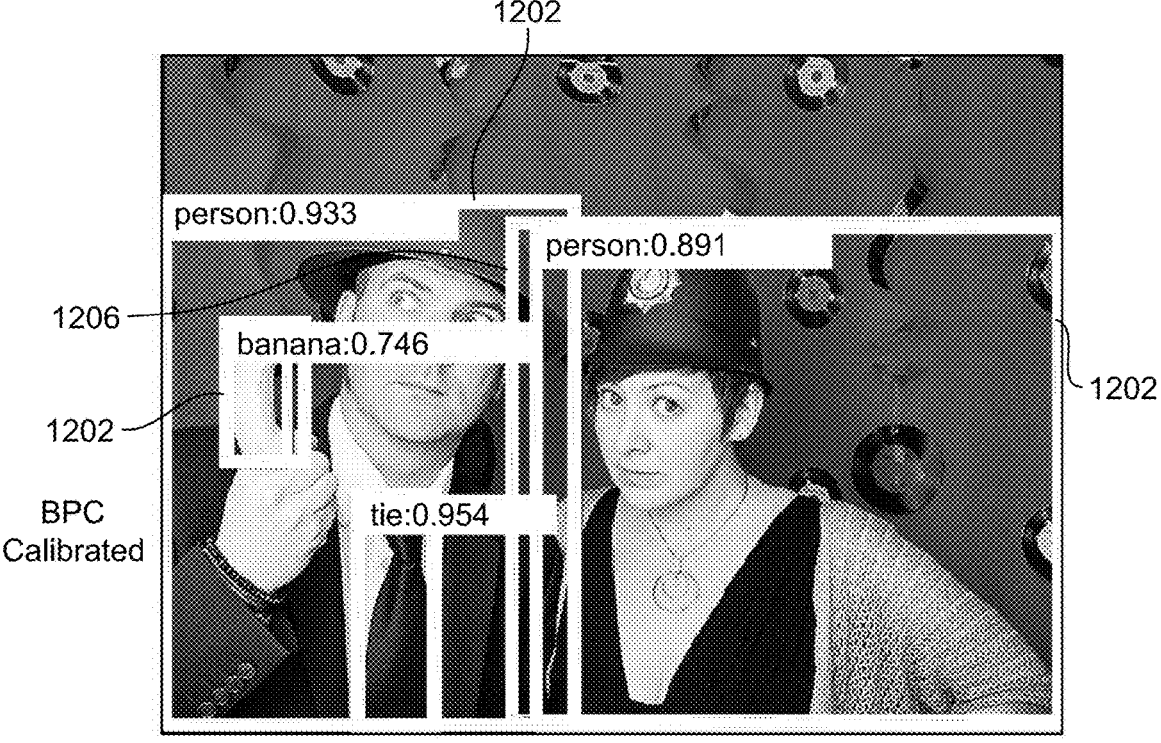
Figures 12Q, 12R:
Figure 12S:
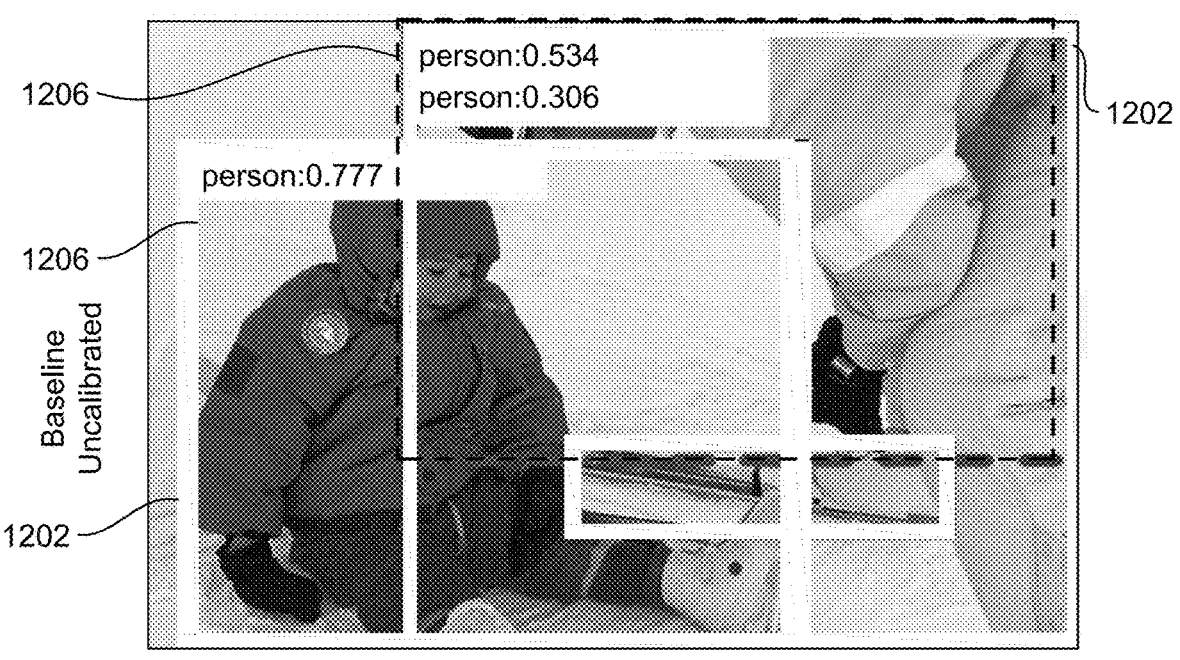
Figure 12T:
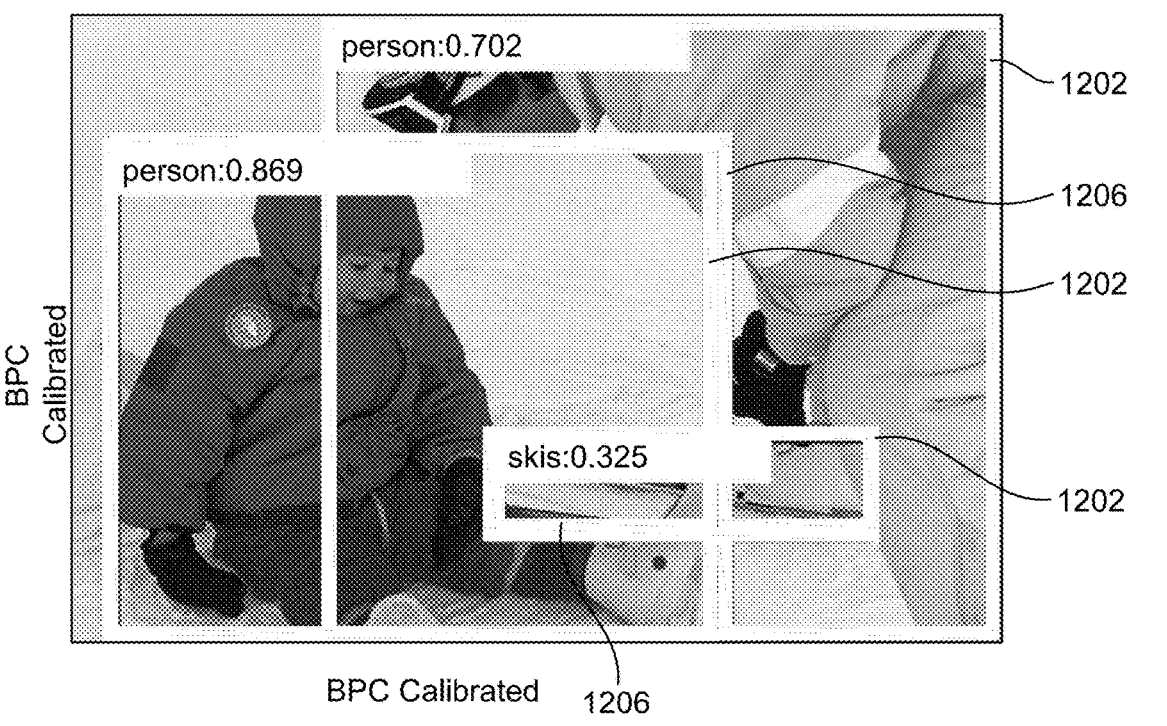

Qualitative Figures: FIGS. 12A-12T illustrate a baseline vs. the BPC: Qualitative results on MS-COCO dataset (In-Domain). Detector trained with the BPC loss forces the accurate predictions to be more confident whereas inaccurate predictions to be less confident. Detection threshold is set to 0.3. Solid line boxes 1202 are accurate predictions with respective confidence scores. Dashed boxes 1204 are inaccurate predictions with corresponding scores. Other boxes 1206 show the ground truth boxes present for corresponding detections.

TABLE 4

| Method | In-Domain | | |
|---|---|---|---|
| | D-ECE↓ | AP box | mAP@0.5 |
| BPC (th = 0.4) | 9.7 | 50.2 | 80.5 |
| BPC (th = 0.5) | 9.1 | 50.1 | 80.2 |
| BPC (th = 0.6) | 11.2 | 50.9 | 81.4 |

Batch Size: Observe in Table. 5 the impact of batch sizes on the loss function. Increasing batch size has little effect on the detection accuracy and calibration performance is not sensitive for given scenario. To get the best for both metrics and without sacrificing the drop in detection performance, opt for batch size 2 for all experiments.

Table 5. Impact of batch sizes on BPC loss. Observe little degradation in detection accuracy by varying batch size (BS) and observe calibration performance is not much sensitive.

TABLE 5

| Method | In-Domain | | |
| --- | --- | --- | --- |
|  | D-ECE↓ | AP box | mAP@0.5 |
| BPC (BS = 1) | 10.5 | 50.3 | 79.6 |
| BPC (BS = 2) | 9.1 | 50.1 | 80.2 |
| BPC (BS = 3) | 8.9 | 48.6 | 78.7 |
| BPC (BS = 4) | 10.2 | 47.3 | 78.3 |

Random Weight Initialization: Impact of different seeds with calibration loss is studied by setting different initialization points for experiments. This shows that calibration is not much influenced by random initialization (Table 6). A seed 42 is set as default in the experiments.

Table 6. Impact of different seeds on BPC loss. Observe changing seeds for initialization has little effect on calibration performance.

TABLE 6

| Method | In-Domain | | |
| --- | --- | --- | --- |
|  | D-ECE↓ | AP box | mAP@0.5 |
| BPC (seed = 30) | 9.0 | 49.2 | 79.7 |
| BPC (seed = 42) | 9.1 | 50.1 | 80.2 |
| BPC (seed = 60) | 8.6 | 51.0 | 80.5 |

Figure 14:
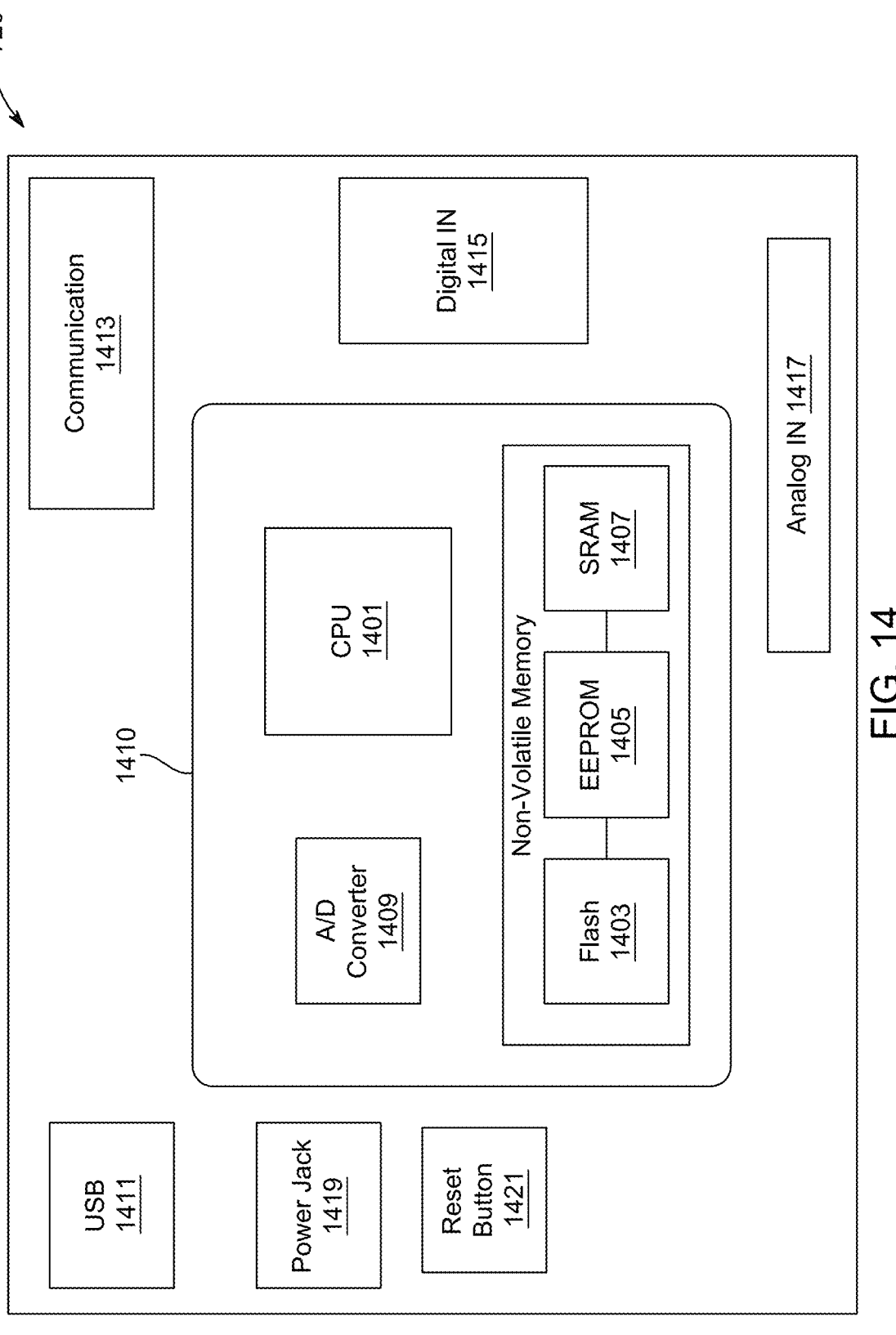
FIG. 14 is a block diagram for a computer-based control system.

FIG. 14 is a block diagram for a computer-based control system. The computer-based control system 620 may be based on a microcontroller. A microcontroller may contain one or more processor cores (CPUs) along with memory (volatile and non-volatile) and programmable input/output peripherals. Program memory in the form of flash, ROM, EPROM, or EEPROM is included on chip, as well as a secondary RAM for data storage. In one embodiment, the computer-based system 620 is an integrated circuit board 620 with a microcontroller 1410. The board includes digital I/O pins 1415, analog inputs 1417, hardware serial ports 1413, a USB connection 1411, a power jack 1419, and a reset button 1421. It should be understood that other microcontroller configurations are possible. Variations can include the number of pins, whether or not the board includes communication ports or a reset button.

The microcontroller is a RISC-based microcontroller having flash memory 1403, SRAM 1407, EEPROM 1405, general purpose I/O lines, general purpose registers, a real time counter, six flexible timer/counters, a A/D converter 1409, and a JTAG interface for on-chip debugging. The microcontroller is a single SOC that operates between 4.5 to 5.5 volts. The recommended input voltage is between 7-12V. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method of using a pretrained deep neural network (DNN) for object detection in an object detection system, the object detection system including a camera and a controller including the pretrained DNN, the method comprising:

capturing an image by the camera;

receiving, by the controller, the image;

predicting, using the pretrained DNN, an object bounding box and a class label; and outputting, by the controller, a calibrated image with the predicted object bounding box, the predicted class label, and a corresponding confidence score, the corresponding confidence score representing a confidence level associated with the predicted class label with respect to the predicted object bounding box, wherein the pretrained DNN was trained based on a total loss function that includes an object detection loss function, a box regression loss function, and a train-time calibration loss function, wherein the train-time calibration loss function is configured to maximize confidence scores for accurate training predictions and minimize confidence scores for inaccurate training predictions, wherein a training prediction is accurate when both a predicted class label of the training prediction matches a ground truth class label, and an intersection-over-union (IoU) between a predicted object bounding box of the training prediction and a ground truth bounding box is greater than a threshold, and wherein a training prediction is inaccurate when either a predicted class label of the training prediction does not match a ground truth class label, or an IoU between a predicted object bounding box of the training prediction and a ground truth bounding box is not greater than the threshold.

2. The method of claim 1, wherein the train-time calibration loss function is a function based on a number of detections, the method further comprising categorizing the detections as one of accurate and confident, accurate and not confident, inaccurate and confident, inaccurate and not confident.

3. The method of claim 2, further comprising modulating the confidence score of each categorized detection by a hyperbolic tangent function.

4. The method of claim 1, wherein the controller is in an autonomous vehicle, the method further comprising:

perceiving objects, by the pretrained DNN, with the camera in the autonomous vehicle.

5. The method of claim 4, wherein the autonomous vehicle includes a braking system, the method further comprising actuating the braking system based on an object detected by the object detection system.

6. The method of claim 5, wherein the autonomous vehicle includes a steering system, the method further comprising actuating the steering system in conjunction with the braking system based on the object detected by the object detection system.

7. The method of claim 6, wherein the autonomous vehicle includes a transmission system, the method further comprising actuating the transmission system, the steering system, and the braking system based on the object detected by the object detection system.

8. An autonomous vehicle control system, comprising:

at least one camera mounted on the autonomous vehicle for capturing an image of an environment outside of the autonomous vehicle;

a controller connected to the at least one camera, the controller being configured to:

receive the image captured by the at least one camera, predict, using a pretrained deep learning network (DNN), an object bounding box and a class label, and output a calibrated image with the predicted object bounding box, the predicted class label, and a corresponding confidence score, the corresponding confidence score representing a confidence level associated with the predicted class label with respect to the predicted object bounding box, wherein the pretrained DNN was trained based on a total loss function that includes an object detection loss function, a box regression loss function, and a train-time calibration loss function, wherein the train-time calibration loss function is configured to maximize confidence scores for accurate training predictions and minimize confidence scores for inaccurate training predictions, wherein a training prediction is accurate when both a predicted class label of the training prediction matches a ground truth class label, and an intersection-over-union (IoU) between a predicted object bounding box of the training prediction and a ground truth bounding box is greater than a threshold, and wherein a training prediction is inaccurate when either a predicted class label of the training prediction does not match a ground truth class label, or an IoU between a predicted object bounding box of the training prediction and a ground truth bounding box is not greater than the threshold.

9. The system of claim 8, wherein the train-time calibration loss function is a function based on a number of detections, the controller is further configured to categorize the detections as one of accurate and confident, accurate and not confident, inaccurate and confident, inaccurate and not confident.

10. The system of claim 9, the controller further configured to modulate the confidence score of each categorized detection by a hyperbolic tangent function.

11. The system of claim 8, wherein the controller is further configured to:

perceive objects, by the pretrained DNN, based on the image captured by the camera.

12. The system of claim 11, further comprising a braking system, the controller is further configured to actuate the braking system based on an object detected by the controller.

13. The system of claim 12, further comprising a steering system, the controller further configured to actuate the steering system in conjunction with the braking system based on the object detected by the controller.

14. The system of claim 13, further comprising a transmission system, the controller further configured to actuate the transmission system, the steering system, and the braking system based on the object detected by the controller.

15. A non-transitory computer-readable storage medium including computer executable instructions, wherein the instructions, when executed by a computer, cause the computer to perform a method comprising:

capturing an image by a camera;

receiving, by the computer, the image;

predicting, using a pretrained deep learning neural network DNN, an object bounding box and a class label; and outputting, by the computer, a calibrated image with the predicted object bounding box, the predicted class label, and a corresponding confidence score, the corresponding confidence score representing a confidence level associated with the predicted class label with respect to the predicted object bounding box, wherein the pretrained DNN was trained based on a total loss function that includes an object detection loss function, a box regression loss function, and a train-time calibration loss function, wherein the train-time calibration loss function is configured to maximize confidence scores for accurate training predictions and minimize confidence scores for inaccurate training predictions, wherein a training prediction is accurate when both a predicted class label of the training prediction matches a ground truth class label, and an intersection-over-union (IoU) between a predicted object bounding box of the training prediction and a ground truth bounding box is greater than a threshold, and wherein a training prediction is inaccurate when either a predicted class label of the training prediction does not match a ground truth class label, or an IoU between a predicted object bounding box of the training prediction and a ground truth bounding box is not greater than the threshold.

16. The computer readable storage medium of claim 15, wherein the train-time calibration loss function is a function based on a number of detections, the method further comprising categorizing the detections as one of accurate and confident, accurate and not confident, inaccurate and confident, inaccurate and not confident.

17. The computer readable storage medium of claim 16, the method further comprising modulating the confidence score of each categorized detection by a hyperbolic tangent function.

* * * * *